(12) United States Patent
Clark et al.

(10) Patent No.: US 6,233,634 B1
(45) Date of Patent: *May 15, 2001

(54) SERVER CONTROLLER CONFIGURED TO SNOOP AND RECEIVE A DUPLICATIVE COPY OF DISPLAY DATA PRESENTED TO A VIDEO CONTROLLER

(75) Inventors: Gordon R. Clark, The Woodlands; George H. Myers, Houston; Louis R. Gagliardi, Tomball; Siamak Tavallaei, Spring, all of TX (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/697,678

(22) Filed: Aug. 17, 1996

(51) Int. Cl.⁷ ....................................................... G06F 13/00
(52) U.S. Cl. ................................ 710/126; 714/5; 714/18; 714/48; 307/66; 307/86; 709/217; 711/145; 711/146
(58) Field of Search ........................ 395/182.04, 183.07, 395/509, 182.09, 182.1, 182.05, 182.13, 306, 200.09; 345/507, 509, 522; 361/86; 307/66, 86, 130; 365/229; 709/217; 714/6, 31, 11, 12, 7, 15; 710/126

(56) References Cited

U.S. PATENT DOCUMENTS

| | | |
|---|---|---|
| 4,232,377 | 11/1980 | Tallman . |
| 4,281,315 * | 7/1981 | Bauer et al. . |
| 4,451,742 | 5/1984 | Aswell . |
| 4,528,459 | 7/1985 | Wiegel . |
| 4,683,469 * | 7/1987 | Elsmore et al. . |
| 4,734,853 * | 3/1988 | Nakano . |

(List continued on next page.)

FOREIGN PATENT DOCUMENTS

| | | |
|---|---|---|
| 0520766A2 | 6/1992 | (EP) . |
| 0520768A2 | 6/1992 | (EP) . |

OTHER PUBLICATIONS

Technology Brief, "Remote Server Management with Integrated Remote Console", Compaq Computer Corporations, Oct. 21, 1996.

*Primary Examiner*—Rupal D. Dharia
(74) *Attorney, Agent, or Firm*—Sharp, Comfort & Merrett, P.C.

(57) ABSTRACT

A communication system is presented whereby sequences of video screens sent from a host CPU to a video controller can be stored and subsequently retrieved by a terminal located remote from the host CPU. The host CPU and video controller form part of a server arranged within a distributed computing system. An administrator situated at the remote terminal can retrieve select video screens produced during server operations to determine information regarding the server configuration and possible causes of server failure or future failure. The sequence of video screens thereby represent video screen changes stored upon a server controller adapted for coupling to the server expansion bus. The video screen changes represent a sequence of video screen changes occurring prior to server failure or after server reset. Those changes provide beneficial information to an administrator located remote from the server, and allows the administrator to communicate with the server using several possible communication protocols. The server controller snoops display data written from the host CPU to the video controller and mirrors the display data upon buffers within the server controller. Information within the buffers can be called upon by a remotely situated administrator regardless of whether server power is lost in the interim.

19 Claims, 12 Drawing Sheets

U.S. PATENT DOCUMENTS

| | | |
|---|---|---|
| 4,777,626 | 10/1988 | Matsushita et al. . |
| 4,866,600 * | 9/1989 | Ballard et al. . |
| 4,924,210 * | 5/1990 | Matsui et al. . |
| 4,984,211 | 1/1991 | Tran . |
| 5,043,919 * | 8/1991 | Callaway et al. . |
| 5,058,075 | 10/1991 | Mizuta . |
| 5,063,494 * | 11/1991 | Davidowski et al. . |
| 5,170,266 * | 12/1992 | Marsh et al. . |
| 5,282,194 * | 1/1994 | Harley, Jr. et al. . |
| 5,353,415 * | 10/1994 | Wolford et al. . |
| 5,384,747 | 1/1995 | Clohset . |
| 5,442,749 * | 8/1995 | Northcutt et al. . |
| 5,451,933 | 9/1995 | Stricklin et al. . |
| 5,537,533 * | 7/1996 | Staheli et al. . |
| 5,567,993 | 10/1996 | Jones et al. . |
| 5,615,334 * | 3/1997 | Wang et al. . |
| 5,617,532 * | 4/1997 | Ushiyama . |
| 5,623,599 * | 4/1997 | Shomler . |
| 5,630,067 * | 5/1997 | Kindell et al. ............... 395/200.09 |
| 5,684,954 * | 11/1997 | Kaiserwerth et al. . |
| 5,796,566 * | 8/1998 | Sharma et al. ........................ 361/86 |
| 5,857,074 * | 1/1999 | Johnson ............................. 709/217 |

\* cited by examiner

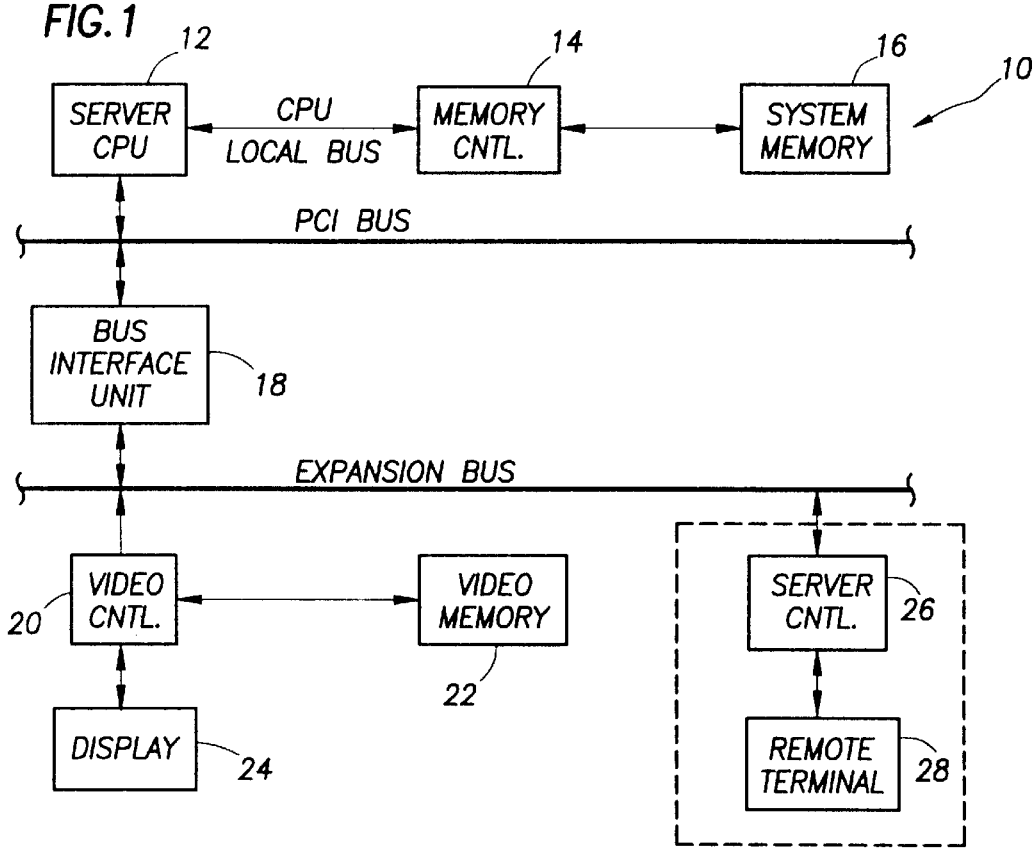
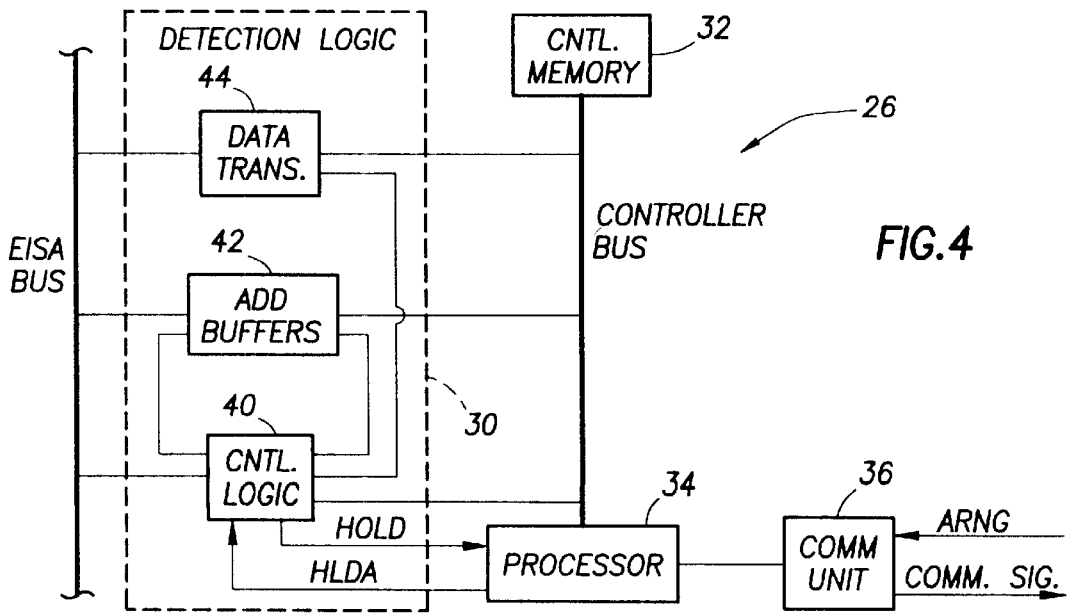

FIG.9a

32768 KB DETECTED

COMPAQ SYSTEM BIOS-E15 (12/06/95)
COPYRIGHT 1982,1995 COMPAQ COMPUTER CORPORATION. ALL RIGHTS RESERVED.

PROCESSOR RUNNING AT 120 MHz

SCSI DEVICE DETECTED-SYSTEM BOARD, SCSI ID 0:COMPAQ M1606S
SCSI DEVICE DETECTED-SYSTEM BOARD, SCSI ID 5:COMPAQ CD-ROM CR-503BCQ

FIG.9b

OS LOADER V3.51

PLEASE SELECT THE OPERATING SYSTEM TO START:

WINDOWS NT SERVER VERSION 3.51 FROM COMPAQ
   WINDOWS NT SERVER VERSION 3.51 FROM COMPAQ (DEBUGGER ENABLED)
   WINDOWS NT SERVER VERSION 3.51 FROM COMPAQ (VGA MODE)

USE ^ AND v TO MOVE THE HIGHLIGHT TO YOUR CHOICE.
PRESS ENTER TO CHOOSE.

SECONDS UNTIL HIGHLIGHTED CHOICE WILL BE STARTED AUTOMATICALLY: 11

FIG.9c

MICROSOFT (R) WINDOWS NT (TM) VERSION 3.51 (BUILD 1057)
1 SYSTEM PROCESSOR [32576 Kb MEMORY]
COMPAQ UNIPROCESSOR HAL-VERSION 301.01 FROM SSD 1.18

FIG.9d

MONITORED SERVER CONSOLE IS IN GRAPHICS MODE.

FIG.9e

STOP 0X0000001e (c000009a 80123f36 02000000 00000246)
UNHANDLED KERNEL EXCEPTION c000009a FROM 8123f26
ADDRESS 80123f36 HAS BASE AT 80100000-NTOSKRNL.EXE

SERVER CONTROLLER CONFIGURED TO SNOOP AND RECEIVE A DUPLICATIVE COPY OF DISPLAY DATA PRESENTED TO A VIDEO CONTROLLER

BACKGROUND OF THE INVENTION

1. Field of the Invention

This invention relates to a distributed computing system, and more particularly to a host computer ("host") which can be accessed from a terminal not physically connected to the host and located at a site remote from the host. The remote terminal can access a stored sequence of video screens, such as a sequence of video screens occurring during host reset or failure operations. The sequence of video screens can then be replayed by a computer administrator located at the remote terminal. Remote access to those video screens allows the administrator to determine how a host operating system is responding to a reset, or possible reasons why the host system failed. Provided with the host is a printed circuit board ("PCB") which can be inserted into a backplane which accommodates the host. The PCB comprises a processor and memory for storing the sequence of video screens even when power is lost to the host.

2. Background of the Relevant Art

Distributed computing systems are generally well known. Such systems allow communications between application programs hosted on numerous computer workstations. There are numerous types of distributed computing systems, often classified by the geographical extent of their communication capability. Terms used to classify the geographical breadth of distributed computing systems are, for example: local area networks (LANs), metropolitan area networks (MANs), and wide area networks (WANs).

Many of the more popular distributed computer systems employ a file server ("server"). Files, or data, are managed by a host within the server. Servers are particularly beneficial in allowing workstations fast access to files stored by the server. Accordingly, file servers embody a host computer which responds to an operating system program (a popular operating system being, e.g., Windows NT®) to not only orchestrate the files, but also to maintain file security, file backup, etc.

An important aspect of maintaining host functions within a server is to manage the host from a site remote from the host and, more specifically, to manage the host at a site remote from the workstations physically linked to the server. Recent trends have seen a steady increase in the number of servers used in business. Nowadays, servers are liberally used possibly at each location of a business entity—rather than employing a centralized mainframe at one location. Unfortunately, funds available to administer many server hosts located at disparate locations is decreasing. While data placed on these servers is considered critical to the business, there remains insufficient means for ensuring their proper operation from a single service site. An expectation that an administrator travel to remote server sites to fix a problem is not only impractical but quite costly given the expense associated with server downtime.

Many operating systems, or applications associated with those operating systems, allow access to the host from a remote site often called a "virtual terminal". A virtual terminal, while not physically connected to the host, nonetheless allows remote control of certain operations of the host. Products such as COMPAQ Server Manager/R® ("SMR") and COMPAQ Insight Manager® ("CIM"), obtainable from Compaq Computer Corp., have attempted to address some of the issues involved in managing a network of distributed servers from a single, remote site. These products allow, inter alia, an administrator to be alerted as to a remote server failure, to reset the server from the remote site, and to access certain information provided on the server console.

It is certainly beneficial to allow remote control of certain server functions, especially those needed to reset one or more servers within a network of servers. Any downtime caused by server failure is probably the most costly time involved in running a distributed computer system. The causes of server failure, often termed server host "crash" are numerous. Any number of malfunctions or design flaws associated with the server hardware, server operating system or application programs running on the server may account for a server crash. If a server crashes, then file access is often lost and business records are temporarily inaccessible until the cause of failure is fixed.

A true benefit would result if an administrator located remote from the server can do more than be alerted to, and then reset, a failed server. In particular, it would be advantageous for the administrator to determine the cause of server failure so that he/she can possibly prevent future failures before they occur. Prevention of failure is as important, if not more important, than resetting a server that has crashed.

The cause of a failure is generally displayed on the server console at the time in which the server crashes. Moreover, irregularities in the server host hardware or operating system software can be detected upon reset (or "boot"). Those irregularities can lead to future failure if not attended to by the administrator. Accordingly, it would be beneficial to gain access to what is displayed on the server host console not only during server reset (or failure) but also leading up to server reset/failure. Information within the video screens (more particularly the sequence of video screens) displayed on the server console, which occur during server failure or reset would help remotely located administrators determine (and hopefully fix) an existing server failure or potential failure.

The video screens, resulting from a reset or failure of the server, comprise a sequence of video screen changes displayed on the host server console by the operating system, system basic input output system ("BIOS"), server application program or other system software. In particular, capture of two screen change sequences are of particular interest to a server administrator. In order to fix an existing failure or a future failure, it would be beneficial that the administrator be given the sequence of screen changes prior to server failure as well as the sequence of screen changes following a reset. Examples of server failure screens displayed on the server console are Microsoft Corp., Windows NT® "blue screens" and Novell Corp., NETWARE® ABEND message which appear on the server console when the respective operating system crashes. These screens provide information such as processor fault indicia, system software routine addresses, and pertinent system memory contents. Upon reset of the server, the power on self test ("POST") code, associated with the aforementioned operating systems, typically performs some system diagnostics and displays information regarding failures detected to the server console screen. Hence, a means for capturing such sequences and replaying them at a remote management site is desired.

In addition to hardware and software problems, a server can also fail if power to the server is halted. Unfortunately, if power is halted, any screen changes as to what occurred prior to failure will be lost. A server is therefore needed which employs a mechanism for saving reset and failure screen changes even when power to the server is lost. The stored screen changes may then be beneficially read at a future date by a remotely situated administrator. The desired mechanism is one which can therefore maintain screen information during power loss, and can selectively forward power only to critical units within the mechanism. Accordingly, a mechanism is needed which is preferably embodied upon a PCB mountable within a server chassis. The PCB is desirably connected to the server host and includes media for storing screen information output from the host, and for maintaining that information even when server power is discontinued.

Communication between a remote site and a server is typically performed via text-based connection protocols, generally known in the industry as American National Standards Institute ("ANSI") terminal emulation protocols.

Although terminal emulation protocols provide a certain level of functionality, it is desirable that other protocols, in particular protocols which enable application layer protocols such as simple network management protocol ("SNMP"), a protocol for communication of server management information, be supported on a point-to-point ("PPP") communications link between the server and the remote site. If a server is to include a PCB embodying a system for communicating with the remote site using a plurality of communications protocols, then it is desirable that subsystems upon the PCB determine which of the supported protocols (i.e., text-based, PPP, etc.) the remote site is using as it communicates with the server.

SUMMARY OF THE INVENTION

The problems outlined above are in large part solved by a remote communication system of the present invention. The remote communication system employs a server controller which can be connected to an expansion bus upon the server. Preferably, the server controller is embodied upon a PCB having edge connectors connectable to an EISA expansion bus. The server controller comprises detection logic which detects write cycles within a video address range. The write cycles are initiated as display data forwarded to a video controller also arranged upon the expansion bus. Detection logic thereby snoops the expansion bus for display data, and then mirrors the display data to a controller memory.

The controller memory, like the detection logic, is embodied upon the server controller PCB and includes a plurality of buffers. Display data forwarded to the controller memory is captured in a local frame buffer which stores frame-by-frame the display data. A previous frame or screen of display data is compared with a current frame or screen of display data to indicate a possible change. The change, as registered on the server display, is stored within current sequence buffers also associated with the controller memory. The current sequence buffers store three types of changes: a sequence of video screen changes which occur prior to server failure or reset, a sequence of video screen changes which occur after the most current server reset, and a sequence of video screen changes which occur after a reset which occurs prior to the most recent reset. Storing current and previous reset video screen changes as well as failure video screen changes (i.e., blue screens or ABEND messages) allows an administrator to determine reasons for server failure or possibilities of future failures.

A terminal located remote from the server can be used by an administrator to draw upon any of the various sequences of video screen changes stored within the controller memory. The server controller can recognize different types of communication protocols sent from the remote terminal. A local processor within the server controller can recognize the communication protocol being sent by employing state machines dedicated to each protocol. Depending upon a character or characters sent, the state machine can make a determination whether the communication protocol is a text-based protocol, a PPP protocol, or a pre-PPP protocol. The various protocols described immediately herein above are well known to the skilled artisan as protocols frequently used as inter-networking protocol used in performing out-of-band connection over, e.g., a phone line or direct serial connection. It is the ability to service many protocols from a remote terminal, and to detect the incoming protocol that defines an advantage hereof. Thus, regardless of the protocol sent, the processor is configured to act upon and forward the communication information to the controller memory. The controller memory can thereby dispatch various video screen sequences in response to directives embodied upon the communication protocol.

The detection logic, controller memory, processor and communication unit are compiled as a system configured upon a PCB. If power to the server should fail, then the primary power supply to the PCB via the expansion bus will also fail. The PCB is configured, however, to maintain certain vital functions even if power from the expansion bus ceases. The PCB employs a secondary power supply, or battery, which supplies power to the processor and controller memory, and selectively to the communication unit when expansion bus power ends. The battery will maintain processor and controller memory activities as well as communication therebetween for a period of time sufficient to sustain video screen information stored within the controller memory. If the communication unit is not being accessed by a remote terminal, then power from the battery to the communication unit is terminated. Thus, decoupling circuitry is present which prevents unnecessary drain upon the battery if the communication unit is not being used. A first decoupling unit is present between a plane (or portion) of the PC upon which the processor and the controller memory reside and a plane of the PCB upon which the communication unit resides. Another decoupling unit is present between the processor and controller memory plane and the plane of the PCB upon which the detection logic resides. The detection units thereby serve not only to decouple power between planes, but also to decouple signal conductors sent between planes. Decoupling power and tri-stating signals between planes helps preserve the charge upon the battery power source so that power needed to maintain the storage sequences of video screen changes during the server downtime is maximized.

BRIEF DESCRIPTION OF THE DRAWINGS

Other objects and advantages of the invention will become apparent upon reading the following detailed description and upon reference to accompanying drawings in which:

FIG. 1 is a block diagram of a host server retrofitted with a server controller accessible by a remote terminal, in accordance with the present invention;

FIG. 4 is a detailed block diagram of the server controller;

FIGS. 9a–9e represent a sequence of displays presented as an exemplary sequence of failure screens;

Figure 2A:
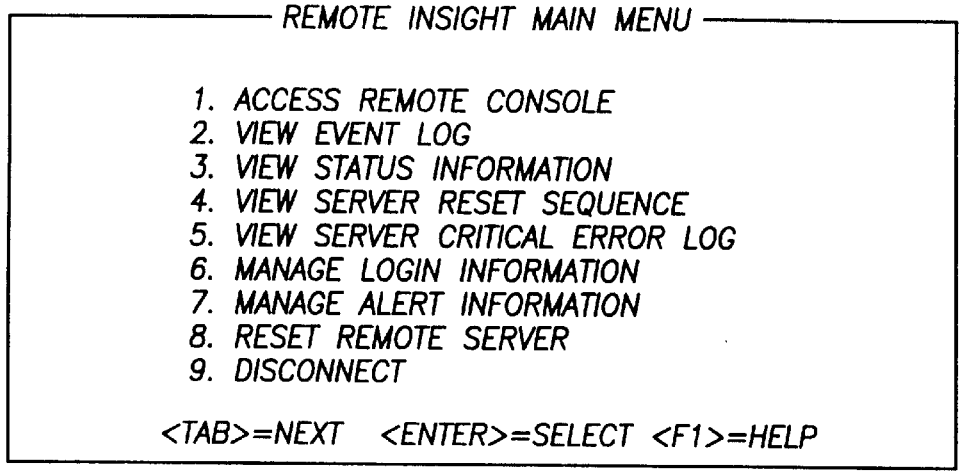
FIGS. 2a–2c are three screen displays of menus which the server controller forwards to a display screen of the remote terminal in response to access from the remote terminal.

While the invention is susceptible to various modifications and alternative forms, specific embodiments thereof are shown by way of example in the drawings and will herein be described in detail. It should be understood, however, that the drawings and description thereto are not intended to limit the invention to the particular forms disclosed, but on the contrary, the intention is to cover all modifications, equivalents and alternatives falling within the spirit and scope of the present invention as defined by the appended claims.

DETAILED DESCRIPTION OF THE INVENTION

Referring now to FIG. 1, a block diagram of a computer system 10 is shown. Computer system 10 preferably includes any system which stores and retrieves files, a suitable system being a file server, an application server, or any other server known in a distributed computing system. System 10 includes a host central processing unit ("CPU") 12 coupled to a memory controller 14 via a CPU local bus. CPU 12 includes any data processing unit which implements a predetermined instruction set and has basic features of, inter alia, execution units, control/timing units and various registers. Exemplary CPU 12 includes the Pentium® processor manufactured by Intel Corp.

Memory controller 14 orchestrates the transfer of data between the CPU local bus and system memory 16. Memory controller 14 responds to various addressing techniques, and is configured to support various storage cell architectures within system memory 16, suitable architectures being dynamic random access memory ("DRAM") or static random access memory ("SRAM"). Memory controller 14 preferably operates synchronously with CPU 12 to ensure maximum transfer bandwidth to and from system memory.

According to one embodiment, CPU 12 is coupled to a peripheral component interface ("PCI") bus. A bus interface unit 18 operates as a bus bridge between the PCI bus and an expansion bus. Bus interface unit 18 includes a buffer to control the transfer of data and address signals between the PCI bus and the expansion bus. Bus interface unit 18 thereby interfaces between data sent over buses operating at possibly different clock speeds and with dissimilar protocols. Preferably, the expansion bus comprises an extended industry standard architecture ("EISA") bus configuration.

Connected to the expansion bus is a video controller 20. Video controller 20 is used to control an electronic display 24 connected thereto. Video controller 20 is indicative of commonly used video controllers such as video graphics array ("VGA") controllers. Video controller 20 responds to addresses upon the expansion bus and forwards corresponding data to video memory 22. Video memory 22 stores video data to be displayed by the video controller upon electronic display 24. Display 24 includes any console or monitor which can receive video data, a preferred display 24 is a cathode ray tube ("CRT") or, alternatively, a liquid crystal display ("LCD"). Video controller 20 and video memory 22 are henceforth referred to collectively as a video subsystem.

Server 10 is retrofitted with a mechanism for saving sequences of video screen changes prior to server 10 failure as well as sequences of video screen changes after server 10 reset. The mechanism for doing so must be unaffected by power loss to the server, and must have the ability to forward the stored video screens to a remote terminal. Such a mechanism is provided by a server controller 26. Server controller 26 is coupled within the chassis of server 10, and is connectable to the expansion bus, wherein controller 26 is accessible from a terminal located remote from server 10. According to a preferred embodiment, remote terminal 28 is coupled to server controller 26 via telephone line communication devices, such as a modem contained in both remote terminal 28 and server controller 26. Remote terminal 28 includes a display apparatus (e.g., a CRT) and an input device (e.g., a keyboard).

According to one embodiment, server controller 26 operates from software available from Compaq Computer Corp. Specifically, Compaq Computer Corp. offers a software product entitled Compaq Insight Manager ("CIM") which can operate upon remote terminal 28. CIM can access firmware loaded into server controller 26 for performing, e.g., replay of the various video screen changes stored in server controller 26.

Hardware and firmware features of server controller 26 make available remote access and control by a remote terminal configured with CIM. Hardware and associated code added to server controller 26 allow a system administrator to dial into the server controller 26 after server 10 has failed, and thereafter communicate with the server controller 26 to view the sequences of display 24 screen changes that occurred prior to that failure and after reset.

The firmware or code within server controller 26 resides as console application code used to communicate with remote terminal 28. FIG. 2a is a screen display of the initial menu screen which the console application displays upon remote terminal 28. The screen displays occur whenever the system administrator dials into server controller 26. The administrator can choose from any of the menu items. If he or she chooses menu item four, then the administrator can view, at his or her remote terminal 28, the sequence of video screens stored within server controller 26. Three different sequences of video screen changes may be played: (i) a sequence of video screens which occur after a prior reset of server 10, (ii) a sequence of video screens which occur after a current reset of server 10, and (iii) a sequence of video screens which occur prior to a failure of server 10. The aforementioned sequence of video screens are herein referred to as current reset sequence, prior reset sequence and failure sequence (collectively "playback sequences").

Figure 2B:
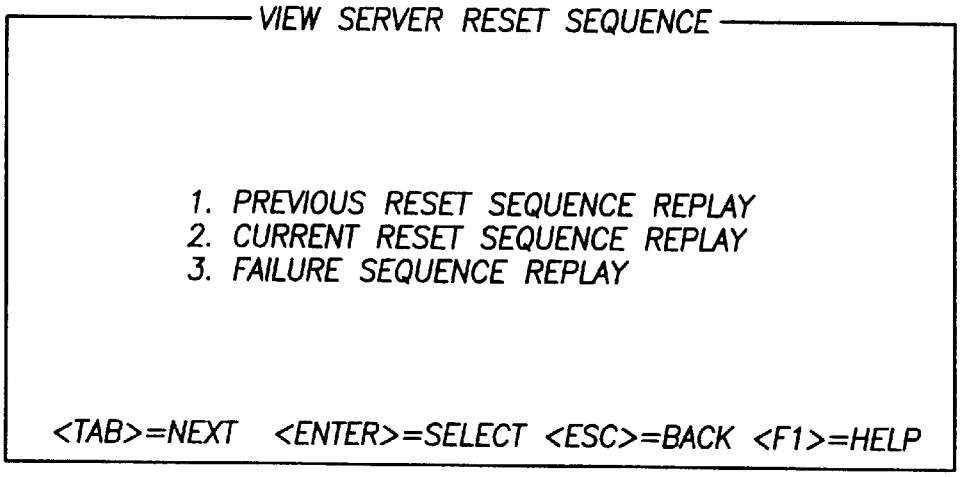
Figure 2C:
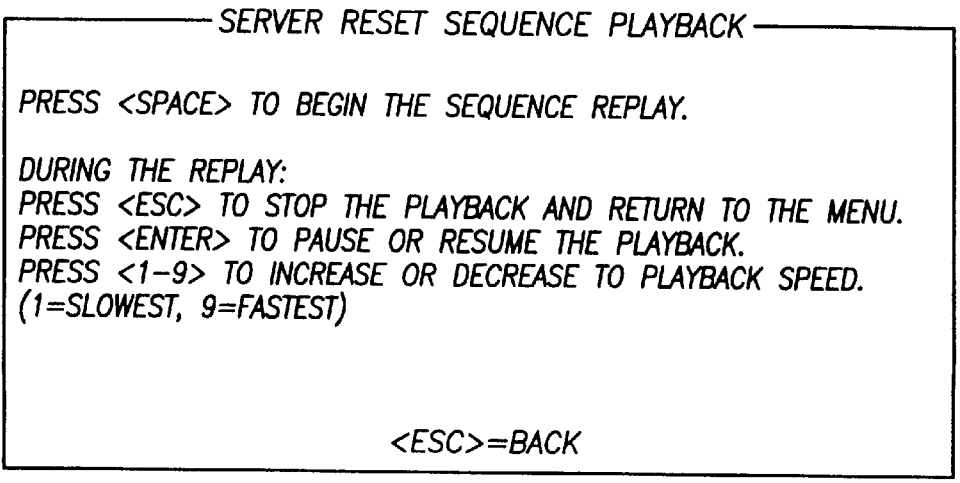

FIG. 2b is a screen display of a menu screen which the system administrator can use to instruct server controller 26 to display any of the aforementioned sequences. FIG. 2c is a screen display of a menu screen which the system administrator uses to instruct the server controller 26 to start, pause, or change the speed of the playback of any of the current reset, prior reset and failure screen sequences.

The current reset screen sequence consists of a sequence of video screen changes that occur immediately after the most recent reset of server 10. The previous reset sequence consists of a sequence of video screen changes that occur immediately after a reset which occurred prior to the most recent reset of server 10. The failure sequence consists of a sequence of video screen changes that occur just prior to a reset, failure or power down of server 10. The number of screen changes which the server controller 26 stores prior to a reset or power down of the server 10 for a failure sequence or subsequent to a prior or current reset sequence is determined by the amount of buffer space available in the server controller 26 for the given playback sequence.

Figure 3:
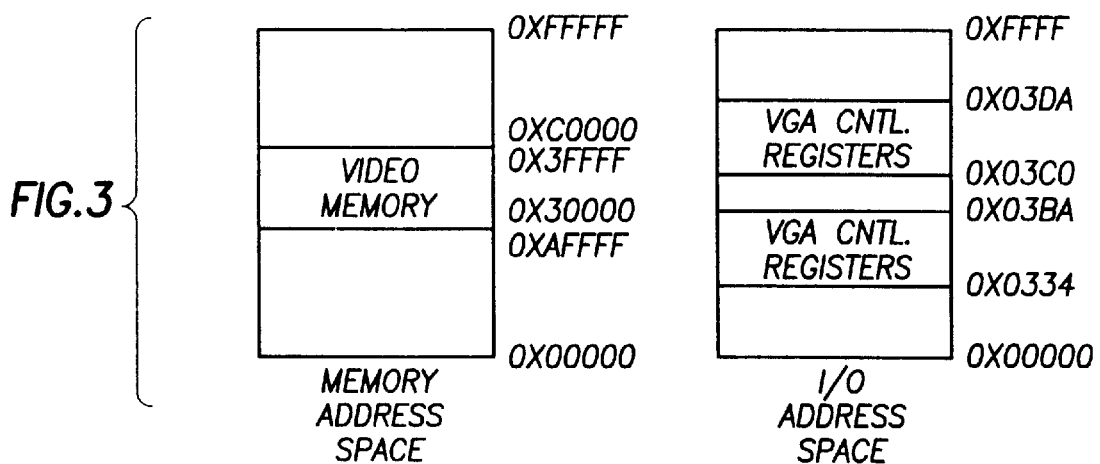
FIG. 3 illustrates portions of the memory address space and I/O address space available to the video memory and video control registers (within the video controller) shown in FIG. 1.

Referring now to FIG. 3, portions of the memory address space and I/O address space in server 10 are shown. The memory address range 0xB0000 through 0xBFFFF is reserved for video frame buffers which reside within video memory 22. The I/O address ranges 0x03B4 through 0x03BA and 0x03C0 through 0x03DA are designated for video control registers within video controller 20. CPU 12 writes values to the video control registers to control various aspects of display 24. The frame buffer memory address range and the video control register I/O address range are herein collectively referred to as video address ranges, or address ranges for data sent to the video subsystem.

Display 24, when in text mode, is organized into a matrix of rows and columns. For example, a common display screen configuration is 25 rows by 80 columns. Thus 2000 (i.e., 25×80) character locations are available on display 24. Each location on display 24 has an associated word (i.e., two bytes) in the frame buffer. The low byte of the word contains the character value (such as a 0x41 for the character "A" in the ASCII character set) and the high byte of the word contains an associated attribute (such as the color, foreground and background intensity, whether or not the character is blinking, etc.). CPU 12 writes values to the appropriate frame buffer locations within video memory 22 to display the desired characters and attributes on display 24. The video data in the frame buffer comprising characters and attributes for display is herein referred to as display data. In the above example, 4000 bytes (2000 locations×2 bytes per location—one for the character and one for the attribute) of the frame buffer are used to store display data representing an entire display screen.

The following three examples illustrate some of the many uses of the video control registers, whose addresses are reserved within the I/O address space. First, CPU 12 writes to the video control registers (i.e., within address ranges 0x03B4 to 0x03BA, or within address ranges 0x03C0 to 0x03DA) to control, e.g., the location and attributes of the cursor on display 24. Second, the CPU 12 writes to the video control registers to change, e.g., the video mode from color mode to monochrome mode or vice versa. Third, the video control registers can specify a start address in video memory 22 from which multiple screens can be stored. In the third example, an assumption is made whereby video memory 22 contains more storage locations than are needed to store one screen of display data. Assuming that video memory 22 contains 64 KB of memory (i.e., 64 KB are available for the frame buffers), then possibly only 4000 bytes of the frame buffer are used to store a screen of display data. Thus, the frame buffer may accommodate multiple sets of display data at a time. CPU 12 writes to the video control registers to specify the start address in video memory 22 of the first set of display data to be displayed on display 24. Information regarding video controllers and more specifically VGA controller which employ video control registers for performing many of the above exemplary control functions is obtainable from, inter alia, Cirrus Logic Corp., part no. CL-GD542x.

Video controller 20 decodes the addresses generated on the expansion bus (preferably EISA bus) and responds to bus cycles in the video address ranges. Video controller 20 not only sends to display 24 the display data stored within the video memory 22, but also controls the display 24 in response to data written by CPU 12 into the video control registers. Video memory therefore contains character and attribute information, whereas video control registers contain information to control display 24.

Similar to video controller 20, server controller 26 also decodes the addresses on the expansion bus in order to detect writes to the video subsystem. When it detects a write to the video address ranges, server controller 26 stores the data written to the video address ranges within the server controller 26. This operation is referred to as "snooping". That is, server controller 26 obtains one or more screens of display data intended for another subsystem (i.e., video subsystem 20 and 22). Data is duplicated upon server controller 26 such that server controller 26 maintains a mirror copy of information within frame buffers of video memory 22 as well as information within video control registers of video controller 20. Snooping the expansion bus for digital signals within the video address range allows duplicative stores to occurs, even though CPU 12 perceives only one write to the video subsystem. Importantly, snooping is performed by server controller 26 in a non-intrusive manner. Data intended for the video subsystem proceeds onto the video subsystem and is not modified or removed by server controller 26.

Referring now to FIG. 4, a detailed block diagram of server controller 26 is shown. Server controller 26 comprises detection logic 30 coupled to the expansion bus. Controller memory 32 is coupled to detection logic via a controller bus. Detection logic 30 comprises combinatorial and sequential logic elements such as those commonly found, for example, in programmable array logic ("PAL") circuits. Details regarding control logic 40, address buffers 42 and data transceivers 44 will be provided after a discussion of their relevance. In particular, the three units within detection logic 30 gain significance given full appreciation to the capabilities of the various components of the server controller 26 and specifically the significance of controller memory 32 and the various buffers therein. Therefore, description of units 40, 42 and 44 will be forestalled until after a discussion of the playback sequences and how various buffers store those sequences.

As part of server controller 26, a processor 34 is needed to orchestrate information upon the controller bus—either information between detection logic 30 and controller memory 32, or information between communication unit 36 and controller memory 32. Processor 34 includes any microprocessor or microcontroller responsive to an instruction set and containing, e.g., an execution unit, memory, input/output devices, and one or more registers. Processor 34 is indicative of microprocessors used for embedded system applications. The controller memory 32 comprises a plurality of digital storage elements. In one embodiment the controller memory 32 comprises pseudo-static RAM. Communication unit 36 includes any device which can communicate to remote terminal 28 configured remote from server controller 26. Communication unit 36 responds to an analog ring signal (ARNG) sent from remote terminal 28, by producing a communication signal (COMM. SIG) back to remote terminal 28. Preferably communication unit 36 comprises a modem. Communication unit further contemplates a serial port coupled to processor 34 and a modem coupled to the serial port external to server controller 26 for communicating with the remote terminal 28.

Processor 34 stores the playback sequences in controller memory 32. Processor 34 could store the playback sequences as sequences of display data representing an entire set of display screens within controller memory 32. However, this would be a relatively inefficient way to use the controller memory 32 and thus the number of video screens stored within controller memory 32 comprising the playback sequences would be relatively small. In the present invention, processor 34 advantageously processes display data to efficiently store the playback sequences as a sequence of display "changes" instead of a sequence of entire display screens. The amount of display data representing changes within a screen is substantially less than the amount of display data representing an entire screen. Thus, the sequence of current reset screens, the sequence of prior reset screens and the sequence of failure screens (i.e., playback sequences) are represented as changes from a reference or "start" screen.

Figure 5:
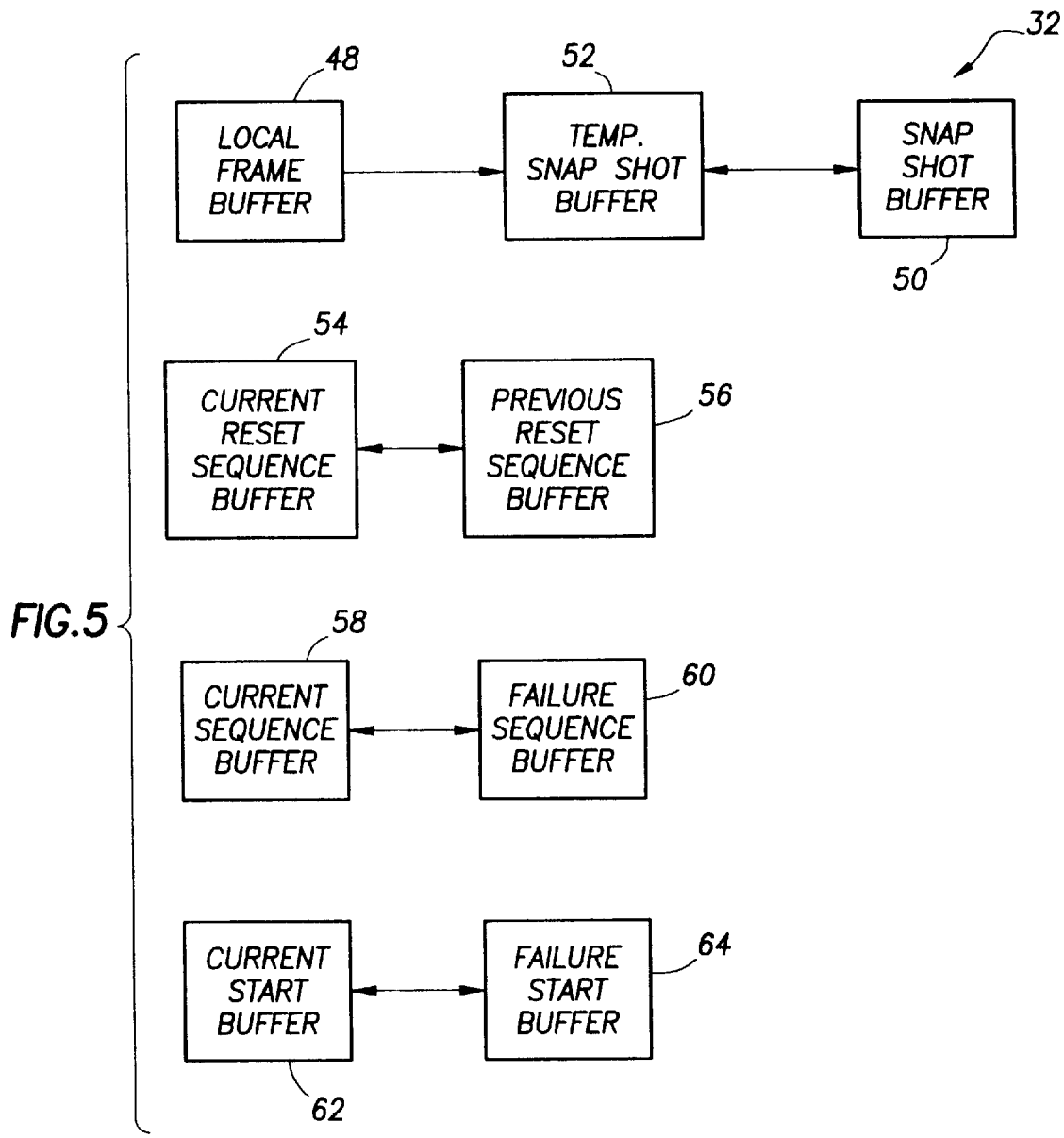
FIG. 5 is a block diagram of various buffers used by the processor shown in FIG. 4 to process and store sequences of video screens sent to the expansion bus from the server CPU.

Referring now to FIG. 5, various buffers within controller memory 32 are shown. Those buffers are used by processor 34 to process and store the playback sequences. A local frame buffer 48 contains the display data snooped during write accesses to video memory 22. That is, detection logic 30 snoops the expansion bus and stores the data destined for the video subsystem into the local frame buffer 48. A snapshot buffer 50 contains a copy or snapshot, created by the processor 34, of the current display data from the local frame buffer 48. A temporary snapshot buffer 52 also contains a snapshot of the current display data from the local frame buffer 48. The temporary snapshot buffer 52 is used to make the playback sequences more legible in the event that screen changes, in particular screen scrolls, are rapidly made.

A current reset sequence buffer 54 contains information associated with the most recent reset sequence. That is, the current reset sequence buffer 54 contains the screen changes beginning with the most recent reset and ending when the current reset sequence buffer 54 becomes full. Screen changes which occur after the current reset sequence buffer 54 is full are ignored. The previous reset sequence buffer 56 contains information associated with the reset sequence just prior to the most recent reset sequence. That is, the previous reset sequence buffer 56 contains the screen changes beginning with a reset which occurred prior to the most current reset and ending when the previous reset sequence buffer 56 becomes full or when the next reset occurs. Screen changes which occur after the previous reset sequence buffer 56 is full are ignored.

A current sequence buffer 58 contains as many of the most recent screen changes that will fit within buffer 58. A failure sequence buffer 60 contains information associated with the failure sequence just prior to the most recent reset of server 10. That is, failure sequence buffer 60 contains the screen changes ending with the most recent reset and contains as many of the screen changes occurring just prior to the most recent reset that will fit therein.

The failure start buffer 64 contains display data of a video screen display associated with failure sequence buffer 60. The failure start buffer 64 contains the initial screen image (or "reference" display screen) in the failure playback sequence and consequently the screen image to which the first change in the failure sequence buffer 60 is applied. Initially the failure start buffer 64 is a blank screen. If and when the failure sequence buffer 60 overflows, the overflow changes are converted to characters and attributes and stored in the failure start buffer 64. Thus, the failure start buffer 64 provides a more useful initial screen image in the event where only a few characters on the screen changed many times over a relatively long period of time. The current start buffer 62 serves the same function relative to the current sequence buffer 58.

It is noted that a reset or failure of server 10 does not cause a reset of server controller 26. However, server controller 26 detects and maintains information concerning the following reset events: power on of server 10, power off of server 10, and reset of the expansion bus. In particular, server controller 26 does not respond to the RSTDRV EISA bus signal, but merely detects the assertion of RSTDRV. If a reset occurs, or if power is removed from server 10, server controller 26 nonetheless maintains operation in order to preserve the playback sequences for display on the remote terminal 28. A secondary power supply is furnished on the same PCB which houses server controller 26 to ensure the playback sequences are maintained. If desired, however, server controller 26 may be reset under software control by writing a predetermined sequence of values into predetermined register locations of the server controller 26 which are accessible to the CPU 12.

When a server 10 reset occurs, pointers are changed so that the current reset sequence buffer 54 becomes the previous reset sequence reset buffer 56, and previous reset sequence buffer 56 is flushed and becomes the current reset sequence buffer 54. A server reset also causes the current sequence buffer 58 to become the failure sequence buffer 60, and failure sequence buffer 60 is flushed and becomes the current sequence buffer 58. Also on reset, the current start buffer 62 becomes the failure start buffer 64 and the failure start buffer 64 is flushed and becomes the current start buffer 62.

Server controller 26 is configured to perform an automatic server recovery ("ASR") reset of server 10. When the server controller 26 detects a failure of server 10, it waits a predetermined amount of time (typically 30 seconds) and resets server 10.

The following is an exemplary sequence of a reset, followed by a failure, followed by a reset on server 10. Server 10 is first powered on which causes server 10 to reset. On reset, server controller 26 flushes information from previous reset sequence buffer 56, flushes failure sequence buffer 60 and flushes failure start buffer 64. During flushes of buffers 56, 60 and 64, a swap of previous reset sequence buffer 56 and the current reset sequence buffer 54 occurs simultaneous with swaps between buffers 60 and 58 as well as swaps between buffers 64 and 62. Thus, reset causes movement of information from buffers 54, 58 and 62 to buffers 56, 60 and 64, respectively. On reset, server 10 software begins performing the POST operations and displaying characters on display 24. Server controller 26 stores the screen changes associated with the POST operations in current reset sequence buffer 54 and current sequence buffer 58. Once the current reset sequence buffer 54 becomes full, the server controller 26 stops storing screen changes thereto. If the current sequence buffer becomes full, the server controller 26 removes the oldest screen changes from the current sequence buffer 58 to make room for the new screen changes and modifies the current start buffer 62 to reflect the old screen changes. Thus, buffer 58 performs similar to a FIFO register, with overflow information sent to buffer 62. As described below, a combination of buffers 58 and 62 (when swapped with bufers 60 and 64) depict the entire failure sequence of video screens prior to the most recent failure.

When a failure of server 10 occurs, in accordance with the second step in the reset-failure-reset three-step example, a sequence of video screens occur upon display 24 indicative of that failure and possibly the cause of that failure. These screens are automatically displayed as part of many server operating systems available as ABEND messages from Novell Netware or a Microsoft NT blue screen. Thirty seconds after failure occurs, server controller 26 performs an ASR reset on server 10. Thus, the second reset within the reset-failure-reset example occurs during ASR reset. The reset, similar to the first reset, enables server controller 26 to flush buffers 56, 60 and 64 while swapping buffers 56, 60 and 64 with buffers 54, 58 and 62, respectively. Similar to the first reset, server 10 again initiates POST operations and forwards characters to display 24. Server controller 26 stores the screen changes occurring after reset, resulting from POST operation, in current reset sequence buffer 54 and current sequence buffer 58. Previous reset sequence buffer 56 now contains the sequence of screen changes associated with the initial power on reset, and the failure sequence buffer 60 as well as failure start buffer 64 now contain the sequence of screen changes leading up to that failure. As opposed to the initial reset contained within the previous reset sequence buffer 56, current reset sequence buffer 54 contains the reset associated with the second reset (or ASR reset).

Video screen changes, as opposed to the entire video screen, are stored as packets in the current reset sequence buffer 54, previous reset sequence buffer 56, current sequence buffer 58 and failure sequence buffer 60. Each packet in buffers 54, 56, 58 and 60 consists of a series of bytes of a specified length. Packets are classified according to a "type", and the packet type is determined by its length along with the first byte (byte 0), and second byte (byte 1) if the packet length is greater than one. The packet types, and the resulting action of server controller 26 upon remote terminal 28, are as follows:

| Packet Type | Action |
| --- | --- |
| Graphics mode: | Display a "host is in graphics mode" message. |
| Bad text mode | Display a "host in an unsupported text mode" message. |
| Server off: | Display a "host is powered down" message. |
| Screen scroll up: | Scroll the screen up a certain number of lines. |
| Clear screen: | Clear the screen. |
| Move cursor: | Move the cursor. |
| Valid text mode: | Reflect valid text mode change. |
| Single character: | Display a character once. |
| Repeat character: | Display a character a certain number of time. |
| Display string: | Display a null terminated string. |

The binary code format used for each packet type listed above is as follows:

| Packet Type | Length | byte 0 | byte 1 | byte 2 | byte 3 | byte 4 |
| --- | --- | --- | --- | --- | --- | --- |
| Graphics mode: | 1 | 0 | | | | |
| Bad text mode: | 1 | 1 | | | | |
| Server off: | 1 | 2 | | | | |
| Screen scroll up | 1 | 128+lines | | | | |
| Clear screen: | 2 | 0 | attr. | | | |
| Move cursor: | 2 | row | column | | | |
| Valid text mode: | 3 | color/mono | rows | cols. | | |
| Single character: | 4 | char | attr. | row | column | |
| Repeat character: | 5 | char | attr. | row | column | count |
| Display string: | 6+ | attr. | row | col. | char0 | char1... |

Bytes 3 and 4, and any subsequent bytes in the display string packet type contain a null terminated string to display. This string must be at least two characters in length plus the null termination so that its length is greater than 5 and thus distinguishable from a repeat character packet using the length test. If the change only contains one character then the change is stored as a repeat character packet with a repeat count of one or a single character packet.

Figure 6B:
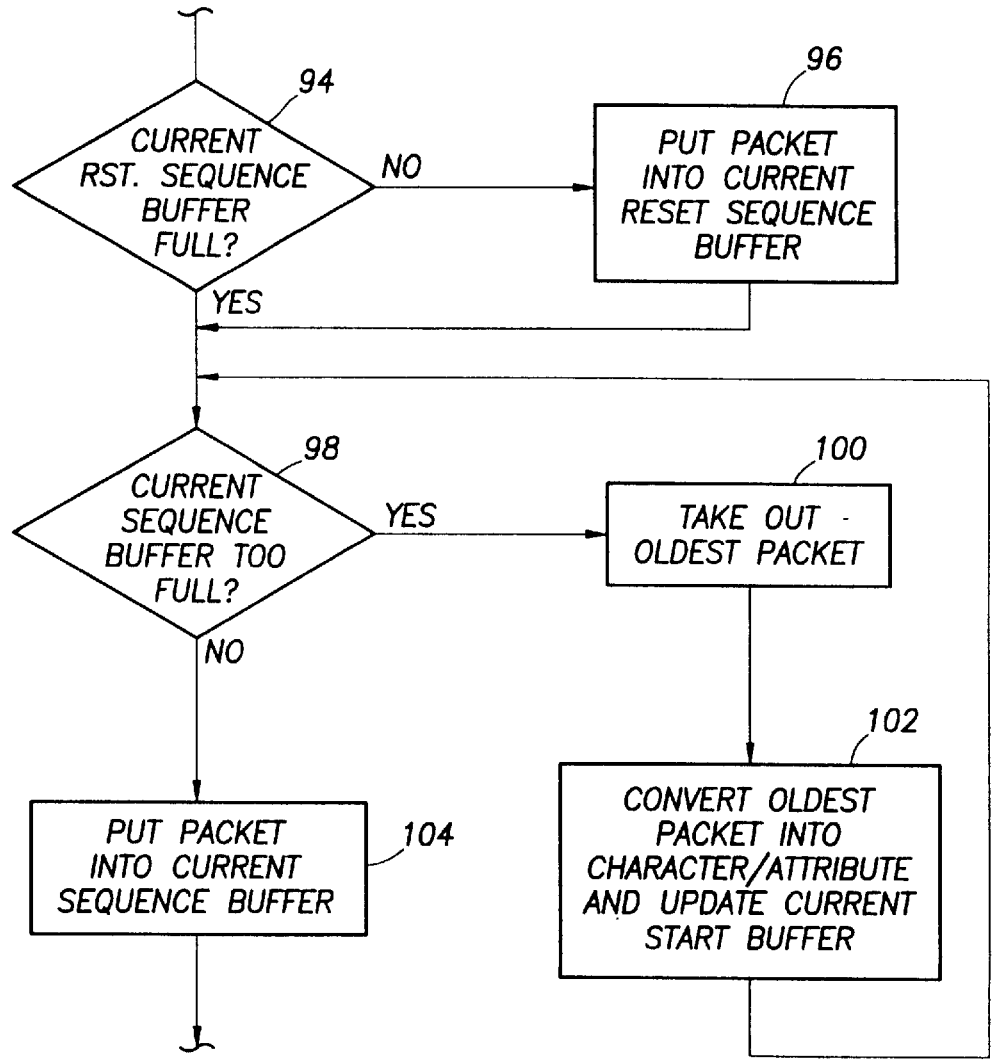
FIGS. 6a and 6b are flowcharts illustrating steps taken by the server controller in storing certain sequences of video screens.
Figure 6A:
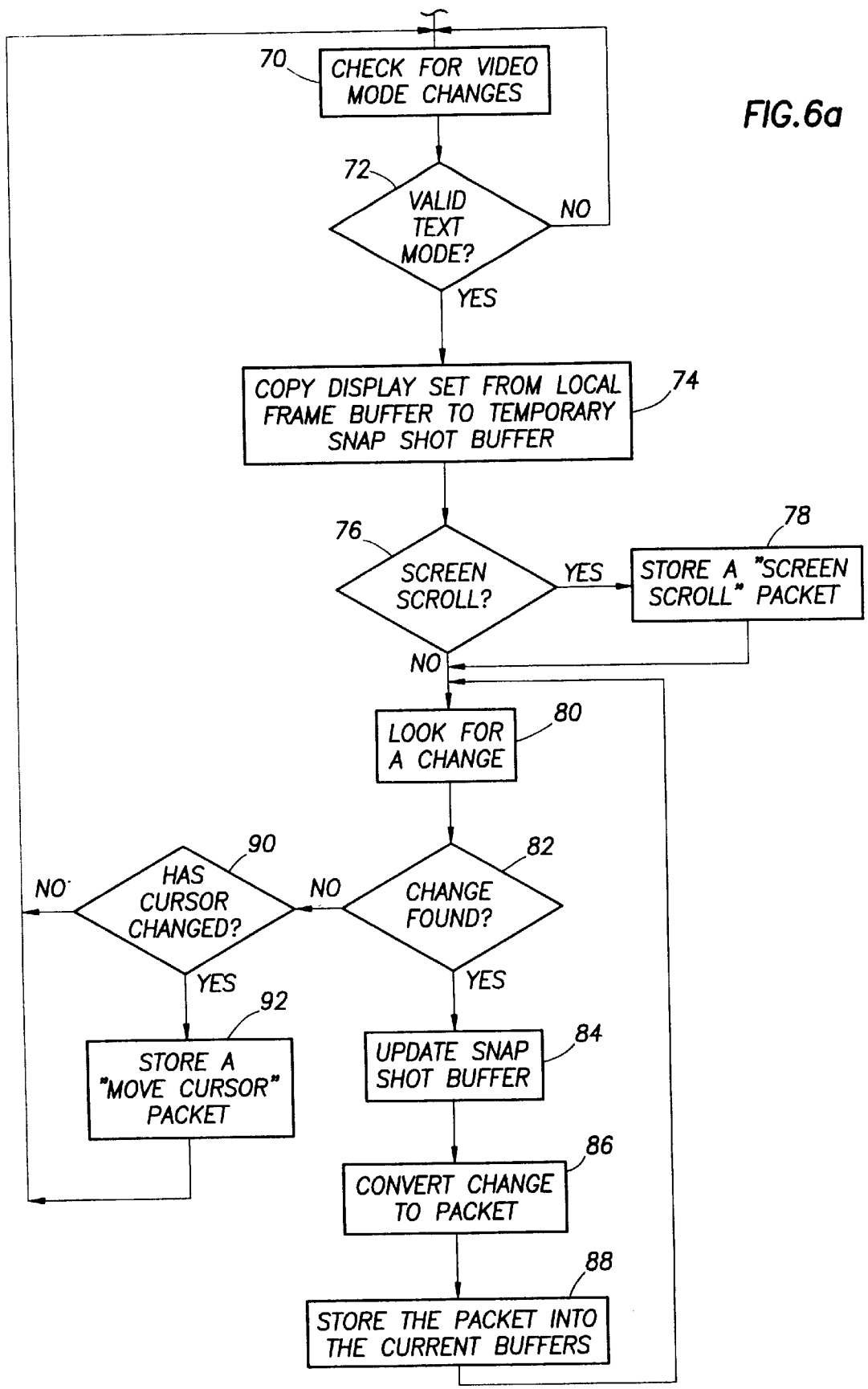

The function of the various buffers residing in the controller memory 32 shown in FIG. 5 will become more apparent in the discussion of the flowchart of FIGS. 6a and 6b. FIGS. 6a and 6b are flowcharts illustrating steps performed by processor 34 to process display data forwarded to buffers 48–52 as well as to store playback sequences amongst buffers 54–64.

Referring to FIG. 6a, step 70 illustrates processor 34 checking the local frame buffer 48 to see if any video mode changes have been made via the video control registers. Examples of video mode changes are a change between graphics and text mode or a change in the screen size, i.e., change in the number of rows and/or columns of a display unit. Before playback sequences can be stored, processor 34 must determine in step 72 if the current video mode is a valid text mode. If not, processor 34 waits until the video mode becomes a valid text mode before processor 34 copies the current display set (indicated by the start address specified in the video control registers) from the local frame buffer 48 to the temporary snapshot buffer 52 in step 74.

Processor 34 then compares the contents of the temporary snapshot buffer 52 with the contents of the snapshot buffer 50 to determine if a screen scroll has occurred in step 76. If a scroll has occurred, processor 34 stores a screen scroll packet to the appropriate buffers in step 78.

Processor 34 can then begin a sequence of steps to start at the beginning of the snapshot buffer 50 and temporary snapshot buffer 52 and compare them for changes. Processor 34 compares the current bytes of buffers 50 and 52 and looks for a change in step 80. If a change is found, as shown in step 82, then processor 34 updates in step 84 the snapshot buffer 50 with the change. Processor 34 then converts the change into a packet in step 86. It is the change, as applied to a packet, that is selectively placed into current buffers 54, 58 and 62 in step 88. Processor 34 then returns to step 80 to look for another change and repeats steps 82, 84, 86 and 88 until in step 82 processor 34 determines that there are no more changes between the display data in buffers 50 and 52.

Once processor 34 has determined that there are no more changes in step 82, processor 34 determines if the cursor has changed positions in step 90. If so, the processor 34 stores a move cursor packet into the current buffers 54, 58 and 62 in step 92 in a manner similar to that performed in step 88. If the cursor has not changed, then a packet rewrite to the existing cursor location is performed.

Referring now to FIG. 6b, a more detailed description of the steps taken to perform step 88 of FIG. 6a are shown. Processor 34 determines if the current reset sequence buffer 54 is full in step 94. That is, step 94 indicates if packets sent to buffer 54 has caused that buffer to become full. If buffer 54 is not full, then processor 34 forwards the present packet to the current reset sequence buffer 54 in step 96. Step 98 indicates whether processor 34 determines if current sequence buffer 58 is too full to receive another packet. If so, processor 34 removes the oldest packet from the current sequence buffer 58 in step 100, and thereafter converts the oldest packet into a character/attribute word. The character/attribute word of the removed packet is then forwarded to the current start buffer 62 in step 102. Processor 34 repeats steps 98, 100 and 102 until it determines in step 98 that the current sequence buffer 58 is not too full to receive the packet, at which time processor 34 puts the packet into the current sequence buffer 58 in step 104.

Following is a code fragment of C language function, find_changes( ), which can be used by processor 34 to periodically execute the functions set forth in the flowchart of FIG. 6a:

```
/***************************************************************
 *
 *    find_changes()
 *
 *       This routine is called repeatedly to find the screen changes and
 *       store them in the various buffers.
 ***************************************************************
/
PRIVATE int find_changes(void)
{
    if (vga_mode_changed()) {
        /*-------------------------------------------------------------
              VGA mode is different but may be in the middle of a change so delay
              for awhile to allow it to finish
         -------------------------------------------------------------*/
        wait(DELAY_TIME);
        if (vga_mode_changed() & (VGA_UPDATE_MODE | VGA_UPDATE_ROWS |
                VGA_UPDATE_COLUMNS | VGA_UPDATE_VALID_STATUS)) {
            /*-------------------------------------------------------------
                 current VGA mode or screen dimensions have changed or the valid
                 text mode status has changed so refresh screen
                 NOTE: It is not necessary to store the entire screen if only the
                       starting address changes.
             -------------------------------------------------------------*/
            /* store the mode change and refresh the screen */
            refresh_screen();
        }
    }
    if (vga_valid_text_mode()) {/* if a valid text mode */
        /*-------------------------------------------------------------
              copy the local frame buffer into the temporary snapshot buffer for
                 comparison with the snapshot buffer
              NOTE: This copy is used for comparison rather than the actual
                 local frame buffer to make fast scrolls more legible.
         -------------------------------------------------------------*/
        memcpy(temp_snapshot_buf,local_frame_buffer,buffer_size);
        /*-------------------------------------------------------------
              check if the screen has scrolled up
         -------------------------------------------------------------*/
        scroll = detect_scroll();
        if (scroll) {
            /* store scroll */
            put_scroll_up(scroll,update_buffers);
        }
        /*-------------------------------------------------------------
              scan through the entire screen comparing the local frame buffer
              with the last snapshot taken, convert any differences to
              packets, and put these packets into the current destination buffers
              and update the snapshot buffer
         -------------------------------------------------------------*/
```

```
vidasm_scan(temp_snapshot_buf,snapshot_buf,buffer_size,number_columns);
        /*---------------------------------------------------------------
                update cursor position
        ---------------------------------------------------------------*/
        /* read cursor position */
        error = vga_cursor_position(&cursor);
        /* compare with last updated position */
        if (!error && ((cursor.row != cursor_row) ||
                (cursor.column != cursor_column))) {
            put_cursor(cursor.row,cursor.column,update_buffers);
        }
    }
    return 0;
}
```

Following is a code fragment of C language function, put_packet( ), which can be used by processor 34 to periodically execute the functions set forth in the flowchart of FIG. 6b.

```
/**********************************************************************
*   put_packet()
*
*       This routine stores a packet in the reset and failure buffers.
**********************************************************************/
PRIVATE void put_packet(char* packet,int length,int destination)
{
    char temp_packet[MAX_PACKET_SIZE];   /* packet retrieved to make room */
    int temp_length;                     /* temp packet length */
    /*---------------------------------------------------------------
            store packet in buffers
    ---------------------------------------------------------------*/
    if (destination & RESET_SEQUENCE_BUFF) {
        /*-----------------------------------------------------------
            NOTE: this put does nothing if the buffer is full.
        -----------------------------------------------------------*/
        buffer_put_packet(packet, length, reset_ptr);
    }
    if (destination & FAILURE_SEQUENCE_BUFF) {
        while (buffer_put_packet(packet,length,failure_ptr)) {
            /*-------------------------------------------------------
                buffer full so need to make room for the packet
            -------------------------------------------------------*/
            if (!buffer_get_packet(temp_packet,&temp_length,failure_ptr)) {
                /* put overflow in FAILURE_START_BUFF */
                play_packet(temp_packet,temp_length,&failure_start);
                failure_dirty_bits[current_failure] = 1;
            }
            else {
                /* failure buffer empty so can't make any more room */
                break;
            }
        }
    }
}
```

Figure 7:
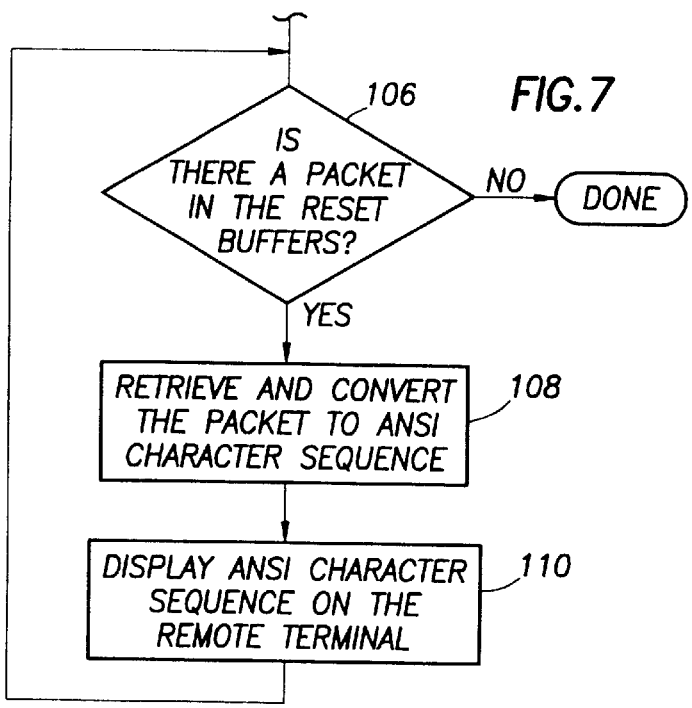
FIG. 7 is a flowchart illustrating steps taken by the processor of FIG. 4 to replay a reset sequence of video screens on the remote terminal.

Referring now to FIG. 7, a flowchart illustrating steps taken by processor 34 to replay a reset sequence of video screens on the remote terminal 28 is shown. The administrator first determines whether the current reset sequence or previous reset sequence is desired to be replayed. Processor 34 responds by choosing the current reset sequence buffer 54 or the previous reset sequence buffer 56, respectively, as the reset buffer to be replayed. When the system administrator instructs the server controller 26 to replay one of the reset sequences, the processor 34 determines in step 106 if there are more packets in the reset buffer to display. If so, processor 34 retrieves the next packet from the reset sequence buffer and converts the packet to a character sequence in step 108. Processor 34 then displays the character sequence on the remote terminal 28 by transmitting the character sequence to the remote terminal 28 in step 110. Processor 34 repeats steps 106, 108, and 110 until processor 34 determines in step 106 that there are no more packets to display.

Following is a code fragment of C language function, video_reset_play( ), which can be used by processor 34 to periodically execute the functions set forth in the flowchart of FIG. 7.

```
/******************************************************************
*       video_reset_play()
*
*       This routine reads the next packet from a reset buffer and displays
*       it on the remote screen. Note that the packet is not removed from
*       the buffer. Call video_reset_rewind() to start playback from the
*       beginning of the buffer again.
******************************************************************/
PUBLIC int video_reset_play(void)
{
    char packet[MAX_PACKET_SIZE];
    int length;
    int error = 0;
    unsigned long rc;
    /*----------------------------------------------------------------
        read packet from buffer (does not remove the packet from the buffer)
    ----------------------------------------------------------------*/
    if (buffer_peek_packet(reset_location,packet,&length,reset_buff)) {
        /*------------------------------------------------------------
            buffer empty so no packet received.
        ------------------------------------------------------------*/
        error = 0;
    }
    else {
        /*------------------------------------------------------------
            buffer not empty so display the retrieved packet
        ------------------------------------------------------------*/
        reset_location++;             /* go to next location */
        play_packet(packet,length);   /* display the packet */
        error = 1;
    }
    return error;
}
```

Figure 8:
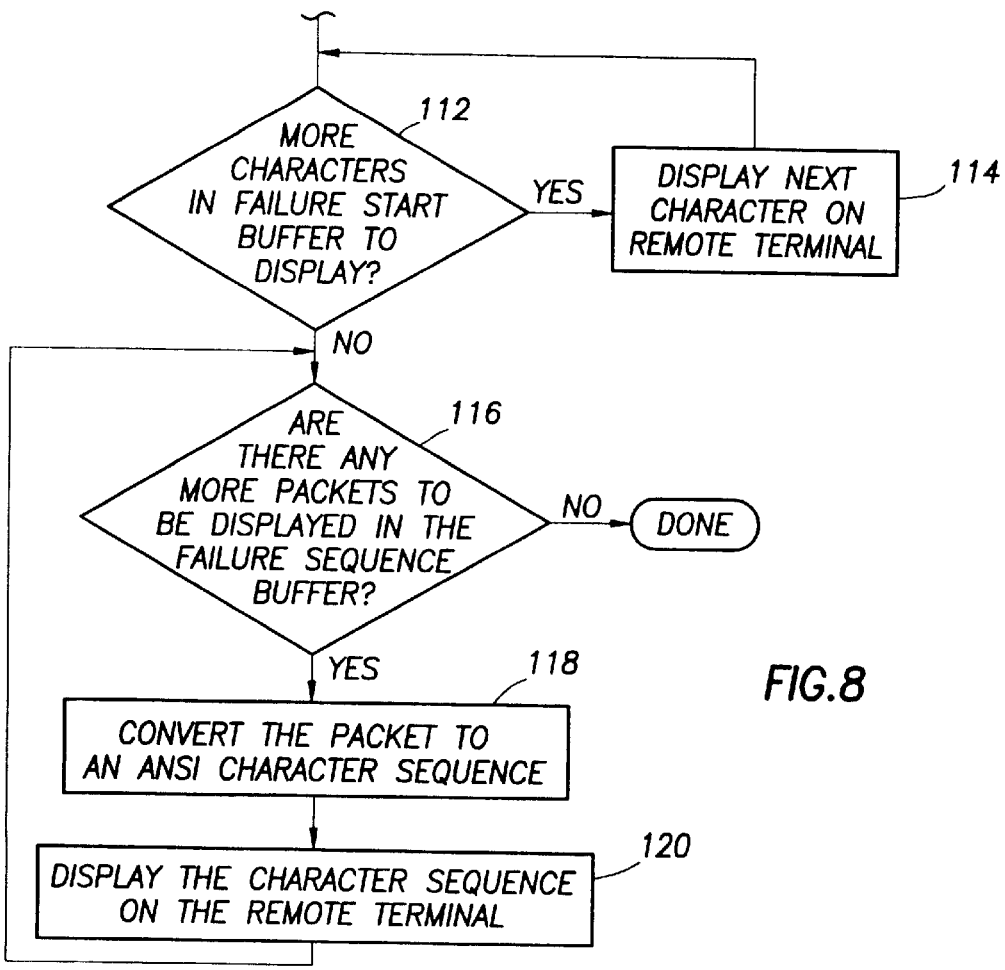
FIG. 8 is a flowchart illustrating steps taken by the processor of FIG. 4 to replay a failure sequence of video screens on the remote terminal.

Referring now to FIG. 8, a flowchart illustrating steps taken by processor 34 to replay a failure sequence on remote terminal 28 is shown. When the system administrator instructs the server controller 26 to replay the failure sequence, processor 34 determines in step 112 if there are more characters in the failure start buffer 64 to display. It is noted that current start buffer 62 and failure start buffer 64 contain characters (i.e., words comprising character/attribute pairs) instead of packets found within buffers (i.e., buffers 54–60) which store screen changes as opposed to the screens themselves. If there are more characters in buffer 64 to display, processor 34 retrieves the next character from the failure start buffer 64 and displays the character on remote terminal 28 by transmitting the character to the remote terminal 28 in step 114. Processor 34 repeats steps 112 and 114 until processor 34 determines in step 112 that there are no more characters in the failure start buffer 64 to display. It is noted that a character is not removed from the failure start buffer 64; instead, a copy of the character is taken.

Once processor 34 determines in step 112 that all of the characters in the failure start buffer 64 have been displayed, processor 34 searches for further packets in the failure sequence buffer 60 to be displayed in step 116. If there are no further packets, processor 34 has then concluded replaying the failure sequence. Otherwise, the processor 34 converts the packet to an ANSI character sequence in step 118. Processor 34 then displays the character sequence on remote terminal 28 by transmitting the character sequence to remote terminal 28 in step 120. Processor 34 repeats steps 116, 118 and 120 until it determines in step 116 that all of the packets in the failure sequence buffer 60 have been displayed.

Following is a code fragment of C language function, video_failure_play( ), which can be used by processor 34 to periodically execute the functions set forth in the flowchart of FIG. 8:

```
/******************************************************************
*       video_failure_play()
*
*       This routine reads the next packet from the failure sequence buffer
and
*       displays it on the remote screen. Note that the first rows*columns
*       times this function is called, it displays the next character from
*       the failure start buffer. After the entire failure start buffer has
been
*       displayed, packets are then read and displayed from the failure
sequence
*       buffer. Packets are not removed from the buffers.
*       Call video_failure_rewind() to restart the playback from the
beginning.
******************************************************************/
```

-continued

```
PUBLIC int video_failure_play(display_screen* screen)
{
    char packet[MAX_PACKET_SIZE];
    char character;
    int attribute,fore,back,rows,columns;
    int length;
    int error;
    unsigned long rc;
    /*-----------------------------------------------------------------------
        set screen dimensions for 1st time through
    ----------------------------------------------------------------------*/
    if ((failure_row == 1) && (failure_column == 1) && (failure_location ==
1)) {
        if (display_screen_dimensions(&last_failure_start,&rows,&columns) ==
0) {
            /* last_failure_start is valid */
            display_change_dimensions(rows,columns,screen);
        }
    }
    /*-----------------------------------------------------------------------
        determine current display screen dimensions
    ----------------------------------------------------------------------*/
    display_screen_dimensions (screen,&rows,&columns);
    /*-----------------------------------------------------------------------
        first display visible portion of the failure start buffer
    ----------------------------------------------------------------------*/
    while ((failure_row <= VGA_ROWS_MAX) &&
            (!display_row_visible(failure_row,screen))) {
        /*-----------------------------------------------------------------------
            while still within the buffer but the row is not visible
            Note: This loop is used to skip rows that are not visible, i.e.
                the bottom (VGA_ROWS_MAX - 25) rows if the display screen
only
                has 25 rows.
        ----------------------------------------------------------------------*/
        failure_row++;
        failure_column = 1;.
    }
    if (failure_buffer_dirty && (failure_row <= VGA_ROWS_MAX)) {
        /*-----------------------------------------------------------------------
            the failure start buffer still has changes which will be visible on
            the display screen. Read the next character from the buffer.
        ----------------------------------------------------------------------*/
        character = VGA_READ_CHARACTER(failure_row,failure_column,
                failure_start_buffer.params.vga);
        attribute = VGA_READ_ATTRIBUTE(failure_row,failure_column,
                failure_start_buffer.params.vga);
        VGA_ATTRIBUTE_TO_COLOR(attribute,&fore,&back);
        /*-----------------------------------------------------------------------
            display this character
        ----------------------------------------------------------------------*/
        display_character(character,fore,back,failure_row,failure_column,1,
screen);
        /*-----------------------------------------------------------------------
            go to next column handling wrap-around
        ----------------------------------------------------------------------*/
        failure_column++;
        if (failure_column > columns) {/* end of line */
            failure_column = 1;
            failure_row++;
        }
        error = 1;/* character displayed */
    }
    else {
        /*-----------------------------------------------------------------------
            the failure start buffer has no more visible changes. Get next
            packet from failure sequence buffer.
        ----------------------------------------------------------------------*/
if(buffer_peek_packet.(failure_location,packet,&length,last_failure_ptr)) {
            /*-----------------------------------------------------------------------
                buffer empty so no packet received.
            ----------------------------------------------------------------------*/
            error = 0;
        }
        else {
            /*-----------------------------------------------------------------------
                buffer not empty so packet received.
            ----------------------------------------------------------------------*/
            failure_location++;              /* go to next location */
```

-continued

```
            play_packet(packet,length,screen);    /* display the packet */
            error = 1;
        }
    }
    return error;
}
```

Playback of playback sequences begins when the administrator presses the space key in response to the menu shown in FIG. 2c. Playback consists of a stream of characters and escape sequences sent to the remote terminal to display the information in the sequence buffers. Each displayable character (ASCII values 32–126 and 128–254) is sent to remote terminal 28 as an 8-bit ASCII value. Some characters (ASCII values 0–31 and 127) are control characters that do such things as ring a bell rather than displaying an actual character. As a result, if one of these non-displayable characters appears in the local frame buffer 48, it is actually sent to the remote terminal as either a space or a similar looking displayable character. An escape sequence (a sequence of characters starting with the escape character (ASCII value 0×1B) is used to perform other actions such as moving the cursor, clearing the screen, and changing the current display color. Server controller 26 transmits all characters unchanged except characters 0–31, 127, 255. These characters are remapped to the following ASCII bytes:

```
        32, 32,32,32,32,32,32, 42,         /* chars  0–7    */
        32, 32,32,32,32,32,32, 42,         /* char   8–15   */
        62, 60,32,33,32,32,32, 32,         /* chars  16–23  */
        94,118,62,60,32,32,94,118,         /* chars  24–31  */
        94,                                /* char   127    */
        32                                 /* char   255    */
```

The following are the escape sequences sent by the server controller 26 where \x1B=ESC character. In the event that the Compaq Insight Manager (CIM) application is executing on the remote terminal 28, server controller 26 transmits certain non-standard escape sequences to communicate with the CIM. Those non-standard escape sequences are denoted with an asterisk in the following Table I:

TABLE I

| Always used: | | |
|---|---|---|
| Clear screen: | \x1b[2J | |
| Move Cursor: | \x1b[n;mH | n = cursor row, m = cursor column (i.e. \x1b[1;2H) |
| *Flint ID: | \x1b[} | |
| −Color: | | |
| +Disable hi intensity: | \x1b[0m | |
| +Foreground hi intensity: | \x1b[1m | |
| +Black Background: | \x1b[30m | |
| Red Background: | \x1b[31m | |
| Green Background: | \x1b[32m | |
| Yellow Background: | \x1b[33m | |
| Blue Background: | \x1b[34m | |
| Magenta Background: | \x1b[35m | |
| Cyan Background: | \x1b[36m | |
| +White Background: | \x1b[37m | |
| +Black Foreground: | \x1b[40m | |
| Red Foreground: | \x1b[41m | |
| Green Foreground: | \x1b[42m | |
| Yellow Foreground: | \x1b[43m | |
| Blue Foreground: | \x1b[44m | |
| Magenta Foreground: | \x1b[45m | |

TABLE I-continued

| Cyan Foreground: | \x1b[46m | |
|---|---|---|
| +White Foreground: | \x1b[47m | |
| Combinations of above: | i.e. \x1b[0;1;47;30m | |
| Only used when talking to CIM: | | |
| *Repeat Character: | c\x1b[nb | c = character to repeat, n = repeat count |
| *Screen Scroll: | \x1b[nS | n = number rows to scroll |
| *Set Number Rows: | \x1b[n~ | n = number of rows |
| *Enable Japanese: | \x1b$B\x1b(B | |
| *Disable Japanese: | \x1b[| | |
| −Color: | | |
| *+Background hi intensity: | \x1b[5m | |

The escape sequences marked with a '+' character in the above Table I are the only color escape sequences used in monochrome modes. All colors except black and hi intensity black are converted to white or hi intensity white.

If the server controller 26 is not communicating with the CIM, the hi intensity background colors are not supported and are sent as the same color but normal intensity. If the foreground is this same color of normal intensity, then the foreground color is remapped so that it will still be visible according to the following Table II:

TABLE II

| Color Modes | | Monochrome Modes | |
|---|---|---|---|
| Black | −> Red | Black | −> White |
| Red | −> Black | White | −> Black |
| Green | −> Yellow | | |
| Yellow | −> Green | | |
| Blue | −> Magenta | | |
| Magenta | −> Blue | | |
| Cyan | −> White | | |
| White | −> Cyan | | |

Referring now to FIGS. 9a–9e, screen shots of an exemplary failure sequence are shown. The screen sequence is exemplary of a playback sequence displayed by the server controller 26 on the remote terminal 28. FIG. 9a is a screen shot of a typical initial screen upon power-up of a server. The screen shows various items regarding the system configuration. FIG. 9b is a screen shot of a typical WINDOWS NT loader screen. The user is given the opportunity to select between a plurality of NT kernels to boot. FIG. 9c is a screen shot of a typical NT boot screen. The screen contains the build version of the kernel, the amount of system memory, processor configuration, etc. FIG. 9d illustrates the message displayed by the server controller 26 on the remote terminal 28 during a playback sequence when the playback sequence contains a packet indicating that the server 10 display 24 was placed in graphics mode by the host CPU 12. FIG. 9e is a screen shot of a typical NT blue screen.

By snooping the expansion bus (preferably, EISA bus) for writes to the video subsystem, server controller 26 advantageously obtains video data updates in real time so that replay of the playback sequences can be realized. In addition, by snooping the expansion bus for writes to the video subsystem, server controller 26 obtains the video data updates in a manner typically non-intrusive to server 10 and, more specifically, non-intrusive to the expansion bus bandwidth. Other solutions obtain video data in an intrusive and non-real-time manner. For example, the COMPAQ Server Manager/R ("SMR") product asserts mastership of EISA bus cycles to obtain data within video memory 22 of server 10. SMR thereby periodically copies a portion of display data from video memory 22 into its own memory. The copied data is then compared with a previous copy of the video data to determine screen changes. The bus mastering approach of the SMR disadvantageously increases traffic on the EISA bus and adds extra bus arbitration delay to other EISA bus masters.

Referring again to FIG. 4, description of the various blocks 40–44 within detection logic 30 is now provided. Detection logic 30 comprises address buffers 42, data transceivers 44, and control logic 40 coupled between the EISA bus and the controller bus. The control logic 40 and processor 34 are coupled by HOLD and HLDA (HOLD Acknowledge) signals. The address buffers 42, data transceivers 44, and control logic 40 cooperate to snoop display data and thereafter write the data to local frame buffer 48 (shown in FIG. 5) which forms a part of controller memory 32.

Controller memory 32 is a resource shared between processor 34 and detection logic 30, in that both the processor 34 and the detection logic 30 modify controller memory 32. The controller memory 32 comprises a single-ported pseudo-static RAM. Detection logic 30 therefore steals cycles away from processor 34 to write the video data to controller memory 32. As write cycles occur to the video subsystem, detection logic 30 decodes the write cycle, puts processor 34 on hold, and writes the video data into controller memory 32. Server controller 26 writes the video data to controller memory 32 concurrently with writing the video data to the video subsystem advantageously sustaining normal video activity on server 10.

Control logic 40 receives the address signals from the expansion bus and decodes the presence of an address in the video address ranges. If an address in the video address ranges appears on the expansion bus address signals, control logic 40 puts processor 34 on hold by asserting the HOLD signal to the processor 34 to arbitrate for controller memory 32. Processor 34 asserts HLDA to grant ownership of the controller bus to control logic 40.

Control logic 40 must ensure that it will be able to obtain ownership of the controller bus and write the video data to the controller memory 32 before completion of the write cycle to the video subsystem. To do so, control logic 40 makes use of the certain signals within an EISA expansion bus. The control logic utilizes EXRDY signal available to an EISA expansion bus. If the expansion bus is an ISA bus, then the control logic utilizes CHRDY signal. In either instance, EXRDY or CHRDY function to delay the expansion bus write cycle to the video subsystem until control logic 40 obtains ownership of the controller bus.

On the rising edge of the EISA expansion bus (expansion bus) BCLK signal, during assertion of the expansion bus START# signal, control logic 40 latches the address from the expansion bus address signals. Control logic 40 examines other control signals on the expansion bus, namely BCLK, START#, CMD#, and W_R to determine if the bus cycle is a write cycle. If the bus cycle is not a write cycle, then control logic 40 stops arbitrating for the controller bus by deasserting the HOLD signal. If the bus cycle is a write cycle, data transceivers 44 drive the video data from the expansion bus data signals into the controller memory 32, thereby completing the write cycle on the rising edge of the expansion bus CMD# signal. The rising edge of CMD# is delayed if the control logic 40 drives the EXRDY signal low.

If the arbitration latency (the time between which control logic 40 asserts HOLD and processor 34 granting HLDA) exceeds the time needed to setup for a write cycle to the video address ranges, the control logic 40 drives the EXRDY signal low on the expansion bus to insert delay cycles, i.e., to delay the rising edge of CMD#. The EXRDY signal being driven low indicates to the master of the expansion bus which is currently performing the write cycle that the recipient of the write cycle is not ready to receive the data. Typically, processor 34 grants HLDA to control logic 40 sufficiently early so that the control logic 40 does not need to assert EXRDY. Thus, server controller 26 snooping is typically non-intrusive.

Control logic 40 translates the address previously latched from the expansion bus address signals to a corresponding location in the local frame buffer of controller memory 32, and also provide translated address to address buffers 42 which drive the translated address onto the controller bus. Control logic 40 then generates control signals to the data transceivers 44, address buffers 42 and controller bus to write the display data from the expansion bus data signals to controller memory 32 at the translated address driven by address buffers 42. Control logic 40 continues to keep processor 34 on hold until the end of a block transfer of display data, i.e., during burst or back-to-back write cycles to the video subsystem. In the event of a burst write cycle or back-to-back write cycles to the video subsystem, advantageously only the initial cycle has intrusion (i.e., incurs delay cycles), if at all.

Snooping write cycles to the video subsystem from the expansion bus into controller memory 32 requires synchronization between the expansion bus and the controller bus since they have different clock signals. This requires multiple synchronization points from both buses to guarantee correct states of signaling (i.e., to reduce the possibility of metastability). It is, therefore, advantageous to determine the earliest point at which a valid write cycle begins and the earliest point at which that write cycle, or series of write cycles, ends. It is therefore necessary to determine the earliest point at which a valid cycle is not a write cycle in order to negate HOLD, thus returning ownership of the controller bus back to the processor 34. This enables processor 34 to perform necessary functions such as processing the playback sequences. Additionally, it is advantageous to determine when a valid write cycle begins in order to, if necessary, drive EXRDY low and thereby insert delay cycles.

Expansion bus clock signal, BCLK, is not particularly useful in determining the beginning and ending of a write cycle because it is not guaranteed to be synchronous to either, i.e., the falling edge of START# or the rising edge of CMD#. For a detailed description of the timing specifications of an EISA bus, reference is made to EISA Specification Revision 3.12, which is hereby incorporated by reference.

The expansion bus Write/Read signal (W_R), indicating a write cycle, is not valid as early as the expansion bus address signals (LA). According to EISA bus specifications, W_R cannot be validated until the rising edge of BCLK as START# is negating. Control logic 40 must be able to determine if a write cycle is occurring so that it does not respond to read cycles but instead allows the video subsystem to respond to read cycles.

EISA expansion bus signals START# and CMD# are not guaranteed to occur in sequence to each other as to the negation of START# and the assertion of CMD#. That is, the two signals may overlap or gap. Consequently, in order to use the falling edge of START# to denote the beginning of a cycle and the rising edge of CMD# to denote the end of a cycle, an equation wishing to denote the full cycle from start to finish must have some input to cover the potential gap between the negation of START# and the assertion of CMD#.

It was determined by the present inventors that in most bus interface implementations using, e.g., bus interface unit 18 as an EISA bus bridge, W_R is valid as BCLK is low and START# is asserted low. This information is helpful in determining the beginning and end of a valid write cycle. In particular, the present invention employs a transparent latch control signal, N_START, having the equation:

N_START=!BCLK*!START#+N_START*CMD#;

Thus, N_START is asserted when BCLK is low and START# is asserted low, and stays asserted until CMD# goes asserted low to cover the previously discussed START# and CMD# gap.

An additional signal, EARLY_DECODE, is defined which is true when the EISA expansion bus address signals are in the video address ranges.

Combining EARLY_DECODE, W_R, CMD# and N_START a valid write cycle, is defined as:

VALID_CYCLE=N_START*EARLY_DECODE*W_R+ VALID_CYCLE*!CMD#;

Using VALID_CYCLE, EXRDY is asserted upon VALID_CYCLE being asserted and the processor 34 not yet having asserted HLDA. EXRDY is then held asserted until after the next falling edge of BCLK in which HLDA has been granted.

Thus, control logic 40 advantageously uses N START to meet the EISA timing requirements with respect to EXRDY and thus in typical situations to cause no intrusion, i.e., no introduction of delay cycles, on operations to the video subsystem. Control logic 40 also uses N_START to perform synchronization between the EISA expansion bus and the controller bus since the two buses have different clock signals. By using N_START (i.e., the term with BCLK being low), the control logic 40 advantageously enjoys at least a 60 nanosecond advantage in synchronization time over using the rising edge of START# (which occurs at least 60 nanoseconds later, i.e., synchronous with the rising edge of BCLK) to determine a valid write cycle.

Figure 10:
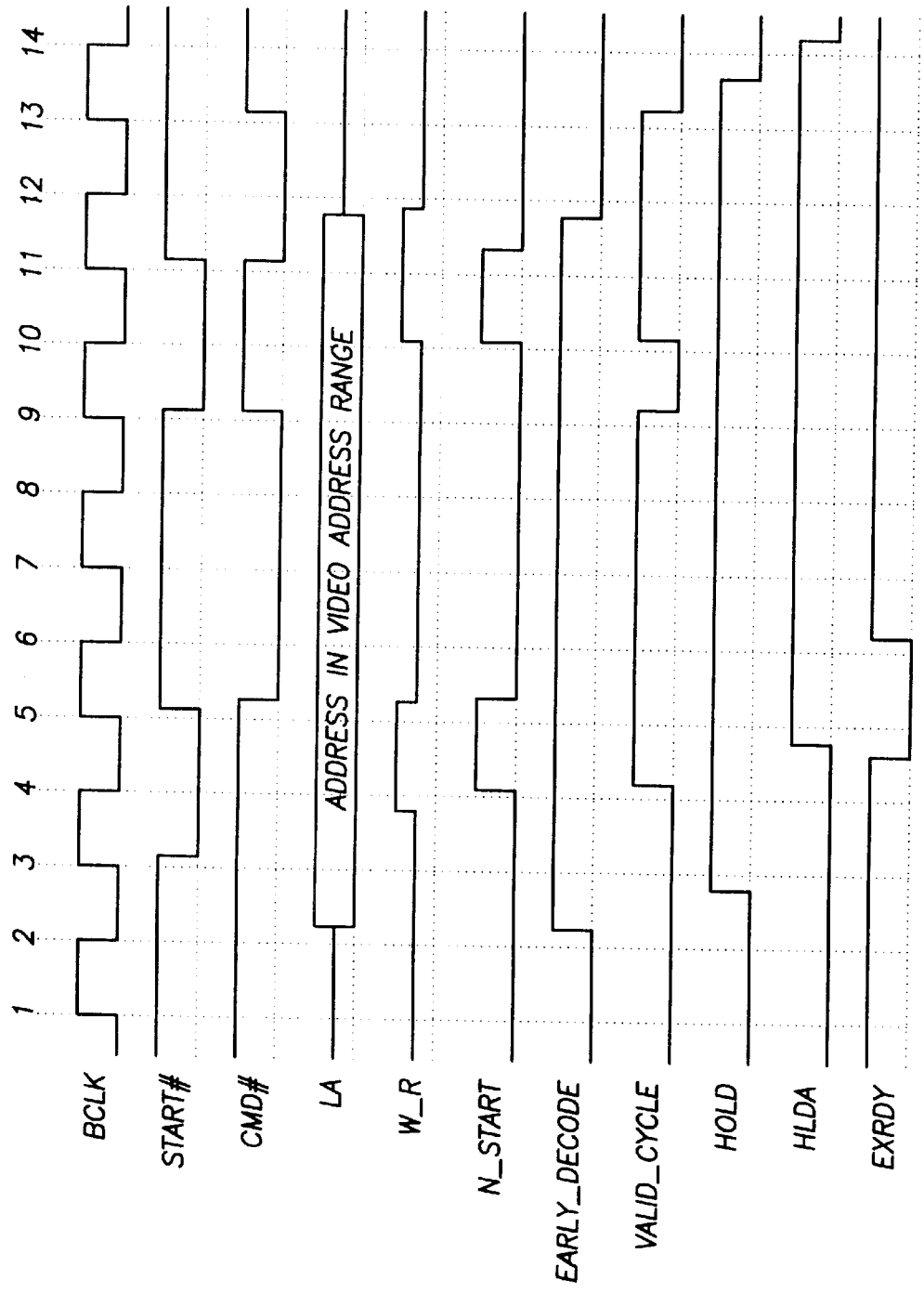
FIG. 10 is a timing diagram of various EISA expansion bus signals, indicating two separate video write cycles in which expansion bus intrusion and non-intrusion occur.

Referring now to FIG. 10, a timing diagram illustrates the relationship of the EISA expansion bus signals BCLK, START#, CMD#, LA, W_R to the EARLY_DECODE, HOLD, N_START, VALID_CYCLE, and EXRDY signals. FIG. 10 depicts a video write cycle in which processor 34 does not grant HLDA sufficiently early enough and the control logic 40 must drive EXRDY low to inset delay cycles followed by a second video write cycle. The first and second video write cycles constitute back-to-back write cycles. According to the present invention, the second video write cycle advantageously does not incur a delay cycle even though the first write cycle did incur a delay cycle. The edges of BCLK are numbered consecutively one through fourteen for clarity in the discussion of FIG. 10. HLDA signal shown in FIG. 10 is a version of the HLDA signal from processor 34 which has been synchronized to the EISA expansion bus clock BCLK.

EISA bus interface 18, on behalf of CPU 12 wishing to write to the video subsystem, generates an address in the video address ranges on the LA signals near BCLK falling edge two. The control logic 40 responsively asserts the EARLY_DECODE signal. Shortly thereafter, the control logic 40 asserts HOLD to the processor 34. The HOLD signal is asserted when the EARLY_DECODE signal becomes asserted and remains asserted as long as the VALID_CYCLE signal remains asserted. By keeping HOLD asserted through VALID_CYCLE, the control logic 40 keeps ownership of the controller bus until the write of the video data to the controller memory 32 completes. Additionally, the HOLD signal is asserted as long as EARLY_DECODE is asserted and the defeat timer has not expired (as discussed below). The HOLD signal is synchronized with processor 34 clock. Near BCLK rising edge three, bus interface 18 asserts START# (which is active low) to begin the address phase of the cycle. The bus interface 18 asserts the W_R signal to signify a write cycle.

In response to BCLK falling edge four, the control logic 40 asserts N_START since BCLK is low and START# is asserted low. N_START remains asserted until the assertion of CMD# low near BCLK rising edge five. N_START being active signifies that W_R is valid and since W_R indicates a write cycle and EARLY_DECODE indicates an address in the video address ranges, the control logic 40 correspondingly asserts VALID_CYCLE. In response to VALID_CYCLE being asserted after BCLK falling edge four, the control logic 40 drives EXRDY low since HLDA has not been granted (in this example). In this example, HLDA is granted near BLCK rising edge five. The control logic 40 continues to drive EXRDY low until after the next falling edge of BCLK in which HLDA is granted, i.e., BCLK falling edge six since EXRDY is sampled by bus interface unit 18 on the falling edge of BCLK while CMD# is asserted low.

Bus interface unit 18 asserts CMD# low and deasserts START# high after BCLK rising edge five to begin the data phase of the write cycle. As previously noted, the rising edge of START# and the falling edge of CMD# here may either gap or overlap according to the EISA expansion bus specification. As previously described, N_START advantageously covers the gap so that VALID_CYCLE may denote a valid video write cycle from start to finish.

In response to EXRDY being driven low during the falling edge of BLCK during CMD# asserted low, i.e., BCLK falling edge six, bus interface unit 18 waits an extra BCLK cycle, i.e., inserts a delay cycle (or wait state), by delaying the deassertion of CMD# high for an extra clock cycle near BCLK rising edge nine. CMD# deasserting high denotes the end of the write cycle.

Since the address on the LA signals remains in the video range for the second write cycle, control logic 40 continues to assert EARLY_DECODE and correspondingly to assert HOLD thus retaining ownership of the controller bus as signified by HLDA being asserted through the end of the second write cycle.

After BCLK rising edge nine, bus interface unit 18 (using EISA bridging) asserts START# to signify the beginning of the address phase of the second video write cycle. The second write cycle is similar to the first video write cycle except that since the control logic already has ownership of the controller bus EXRDY is not negated low during the second write cycle. Therefore, bus interface unit 18 deasserts CMD# high near BLCK rising edge thirteen (i.e., a full clock cycle earlier than in the first write cycle) to end the data phase of the second write cycle.

The second video write cycle is also representative of a non-back-to-back video write cycle in which HLDA was granted sufficiently early such that control logic 40 did not have to drive EXRDY low to insert delay cycles.

In one embodiment of the present invention, server controller 26 further comprises a controller video subsystem (not shown) similar to the video subsystem of server 10 comprising video controller 20 and video memory 22. The controller video subsystem may be selectively disabled by system configuration software. The controller video subsystem is an ISA device. If the controller video subsystem is enabled, server controller 26 negates the ISA bus signal CHRDY rather than the EISA expansion bus EXRDY signal.

A purpose of the controller video subsystem is to cause writes of video data to appear on the expansion bus in the event that the VGA controller on server 10 is a PCI VGA controller. Otherwise, the PCI VGA controller would decode and respond to video writes thus causing the bus interface unit 18 to not forward the video write to the EISA expansion bus. As a result, there would be no video write cycles on the EISA expansion bus or the server controller 26 to snoop. Thus, when a PCI VGA controller resides in the system, the user must enable the controller video subsystem on the server controller 26 and disable the PCI VGA controller in order to enable video write cycle snooping and playback sequence capturing.

It is common for implementations of bus interface unit 18 (i.e., EISA bus bridge) to drive an address on the expansion bus address signals to, at the end of a valid cycle, latch and drive that address on the expansion bus (i.e., EISA bus) during an idle cycle occurring after the valid cycle, so the address signals do not float. This condition would cause control logic 40 to assert the EARLY_DECODE signal and consequently to assert HOLD to the processor 34 continuously for relatively large amounts of time. As a result processor 34 would be needlessly starved. One solution to this problem would be to negate HOLD at the end of a cycle on the rising edge of CMD#. However, the result would be that the control logic 40 would have to re-arbitrate for the controller bus and re-synchronize between the EISA expansion bus and controller bus for each write cycle of a block of back-to-back write cycles by negating EXRDY thus introducing delays.

The present invention employs a defeat timer in order to solve the problem described above. Control logic 40 comprises a counter which counts a certain number of BCLKs after a cycle if the EISA expansion bus address signals still have an address in the video address ranges. When the counter reaches terminal count without a new assertion of START#, the control logic 40 negates HOLD and does not assert HOLD until the next START# assertion with the control logic 40 decoding an address in the video address ranges.

Thus, by employing the defeat timer, control logic 40 advantageously asserts HOLD earlier than would otherwise be possible if the control logic 40 waited until the assertion of START# to assert HOLD and is thus more likely to not introduce delay cycles to the server during video data writes to the video subsystem. The defeat timer further advantageously enables control logic 40 to keep HOLD asserted during a block of back-to-back valid video write cycles, thus potentially avoiding introducing delay cycles to server 10 during video data writes to the video subsystem.

Remote terminal 28 establishes a communications connection with server controller 26 via communication unit 36. The connection between the remote terminal 28 and server controller 26 is commonly referred to as an out-of-band connection, or asynchronous connection. An out-of-band connection refers to a network connection that is established through a phone line or direct serial connection, rather than through a standard network medium such as a local area network Ethernet connection. By providing an out-of-band connection, server controller 26 can establish communication with the remote terminal 28 both when server 10 is functioning normally or when a failure occurs, such as an operating system crash or a failure on the local area network to which server 10 is connected.

In a first mode, remote terminal 28 establishes connection with the server controller 26 using the ANSI terminal emulation protocol, referred to henceforth as the text protocol. In a second mode, remote terminal 28 establishes a point-to-point-protocol (PPP) connection with server controller 26. PPP is described in numerous Request For Comments (RFC) of the Internet Engineering Task Force ("IETF") whose Uniform Resource Locator ("URL") is http://www.ietf.cnri.reston.va.us/home.html. In particular RFC 1661, 1662 and 1663 are pertinent to the present invention and are hereby incorporated by reference. When the remote terminal 28 dials in to the server controller 26, server controller 26 software executing on the processor 34 of the server controller 26 advantageously automatically determines which of the two data link layer protocols the remote terminal 28 is using.

In the first mode, a portion of server controller 26 software, referred to as the server controller console application, communicates with remote terminal 28 using the text protocol. The server controller console application enables remote terminal 28 to access various features of the server controller 26 such as viewing playback sequences. The server controller console application additionally allows the system administrator to perform remote resets, manage alert and login information, remotely access the console, view event logs, error logs and status logs of server 10. Referring again to FIGS. 2a–2c, three menu screens of the server controller console application are shown. Typically, remote terminal 28 is a computer executing a popular ANSI terminal emulation software application available from various venders, such as the well known products SYMANTEC pcANYWHERE or DATASTORM TECHNOLOGY ProComm, to communicate with server controller 26.

In the second mode, remote terminal 28 establishes a TCP/IP link with server controller 26 over the PPP connection similar to that of a local area network (LAN). Typically, remote terminal 28 executes the COMPAQ Insight Manager (CIM) to communicate with the server controller 26 over the TCP/IP connection. Server controller 26 communicates with the CIM in two manners. First, server controller 26 communicates with the CIM via a TELNET connection to execute the server controller console application just as in the first mode using the text protocol.

Second, server controller 26 sends/receives SNMP packets to/from the CIM for the purposes of managing the server 10. For example, server 10 may detect a failure or other event on server 10 and send an SNMP trap packet through server controller 26 to the CIM executing on the remote terminal 28 to notify the system administrator of the event just as it would if the CIM were executing on a client on the LAN to which server 10 is connected. Additionally, in the event of a server 10 failure, server controller 26 may detect the failure and autonomously send an SNMP trap packet to the CIM. In this second mode, i.e., over the PPP connection, server controller 26 may simultaneously communicate with the remote terminal 28 via the server controller console application and SNMP packets.

Another example of server 10 management via CIM is the remote terminal 28 sending a "get request" SNMP packet to the server 10 via server controller 26 to request management information about the server, such as the health of one of the server's subsystems. Server controller 26 forwards the SNMP packet to the operating system. The operating system gathers the requested information and sends a "get response" packet to the server controller 26. The server controller 26 in turn forwards the packet to the CIM.

The WINDOWS NT Remote Access Services (RAS) can establish PPP connections to provide communication between two computers connected by a null-modem. The NT RAS employs a proprietary method of establishing this PPP connection. The method, referred to herein as the "pre-PPP protocol", is to exchange a pair of strings between the two computers. The first computer, wishing to establish the connection, sends the string "CLIENT" to the second computer. Next, the second computer, after receiving the "CLIENT" string, sends the string "CLIENTSERVER" to the first computer. Once this exchange of the two strings has occurred, the two computers proceed to exchange the necessary character packets to establish the PPP connection. In standard PPP connections this initial exchange of the two strings is not required. Server controller 26 is capable of establishing a PPP connection with both the NT RAS over a null-modem as well as remote terminal 28 using the standard PPP protocol.

Figure 11:
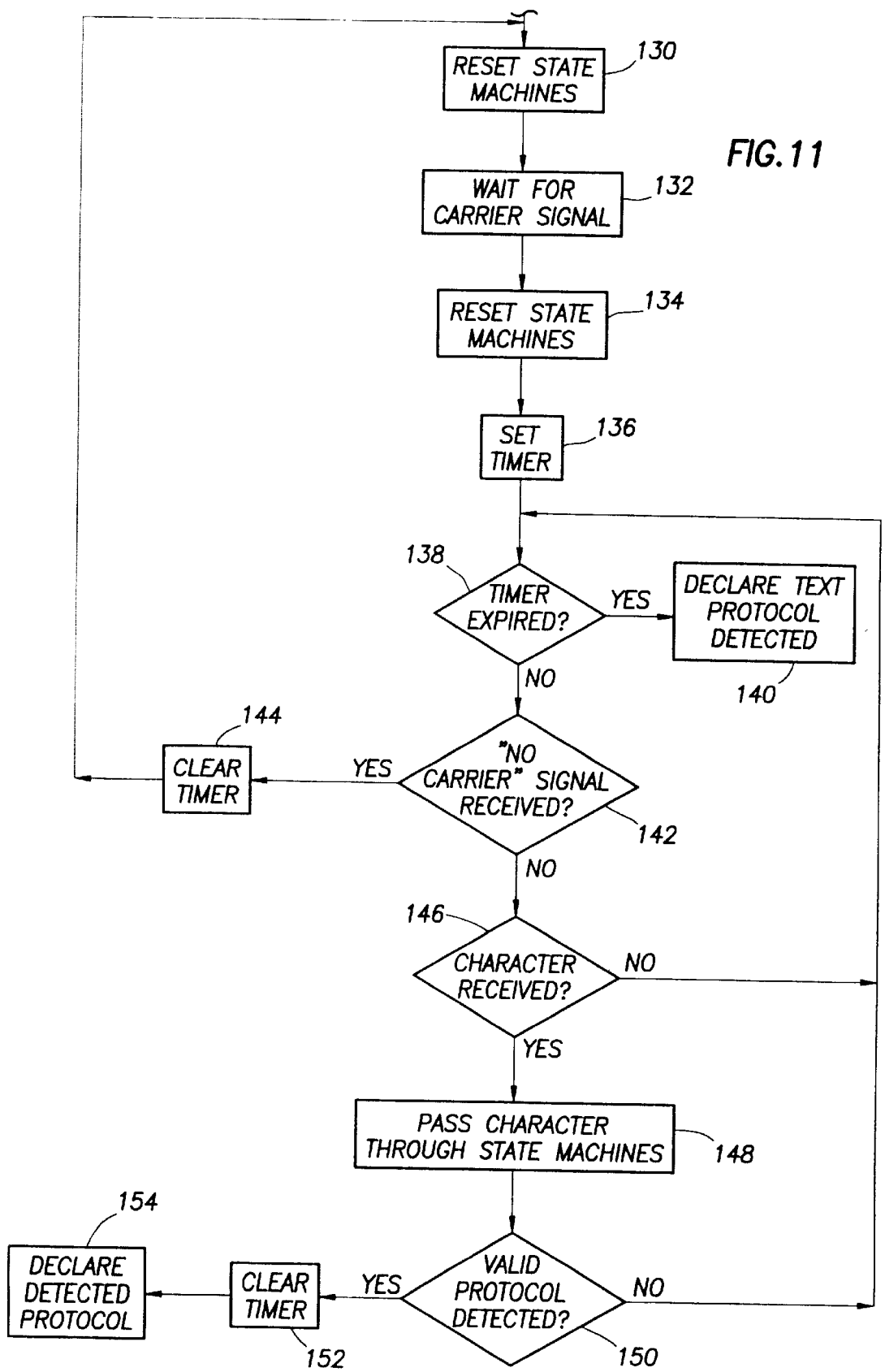
FIG. 11 is a flowchart illustrating steps taken by the server controller to detect various communication protocols useable by the remote terminal.

Referring now to FIG. 11, a flowchart is presented which illustrates how server controller 26 detects which communication protocol is sent from remote terminal 28. Prior to remote terminal 28 establishing a connection, server controller 26 software resets three state machines within the server controller 26 software in step 130. A state machine exists for each of the valid protocols: the text protocol, the PPP protocol, and the pre-PPP protocol.

During times when server controller 26 waits for an interrupt from communication unit 36, playback sequences can be processed over by processor 34. When a carrier signal is received upon server controller 26, software within controller 26 resets the state machines in step 134 and sets a timer in step 136. In one embodiment, the timer is set to expire in 30 seconds. The server controller 26 software determines if the timer has expired in step 138. If the timer has expired, the server controller 26 software declares the protocol to be the text protocol by communicating to an upper level task in the server controller 26 software that the protocol is the text protocol in step 140.

Prior to receiving a character or signal from remote terminal 28, software within server controller 26 can process the video screen changes. Once the interrupt occurs indicative of a character or signal present, server controller 26 software determines if a "no carrier" signal was sent by the communication unit 36 to indicate a loss of carrier from the remote terminal 28 in step 142. If the carrier has been lost, the server controller 26 software clears the timer in step 144 and returns to step 130.

If a "no carrier" signal was not received in step 142, the server controller 26 software determines if a character was received in step 146. If not, the server controller 26 software returns to step 138 to wait for either the timer to expire or an interrupt to be received indicating that a signal or character has arrived.

If a character was received in step 146, the server controller 26 software passes the character to each of the three protocol state machines in step 148. If none of the state machines detect a valid protocol in step 150 the server controller 26 software returns to step 138. If one of the state machines detects a valid protocol in step 150, the server controller 26 software clears the timer in step 152 and then declares to the upper level task which of the three protocols was detected in step 154.

The processor 34 is configured to receive interrupts from various sources, such as the communication unit 36 as mentioned in the description of FIG. 10 above. The processor 34 comprises an interrupt descriptor table, wherein each entry in the table references an interrupt service routine associated with an interrupt source. When one of the interrupt sources generates an interrupt, processor 34 begins executing the interrupt service routine referenced by the entry in the interrupt descriptor table corresponding to the interrupt source. The interrupt service routines are part of the server controller 26 software and execute on the processor 34. Communication unit 36 is configured to interrupt processor 34 upon reception of a character or signal, such a "carrier" or "no carrier", from the remote terminal 28. The interrupt service routines communicate with other software tasks executing on the processor 34 to facilitate communications with the remote terminal 28.

Initially, i.e., prior to the remote terminal 28 establishing a connection with the server controller 26, the interrupt descriptor table entry associated with the communication unit 36 is populated with a reference to a protocol detection interrupt service routine. The protocol detection interrupt service routine is the portion of the server controller 26 software which comprises the three protocol state machines. The protocol detection interrupt service routine is also the portion of server controller 26 software which receives an incoming character from communication unit 36. Each character received by the protocol detection interrupt service routine acts as the input to the three protocol state machines.

Once the upper level task has been notified that a valid protocol has been detected, either in step 140 or step 154, the upper level task populates the interrupt descriptor table entry associated with the communication unit 36 with a reference to an interrupt service routine specific to the particular protocol detected. The PPP and pre-PPP protocols have the same interrupt service routine.

Appendix A contains an assembly language source code listing of portions of the PPP interrupt service routine. The code portions illustrate how the interrupt service routine receives and processes incoming characters to validate and/or form a valid and whole PPP packet. Once a PPP packet has been formed, the interrupt service routine notifies an upper level task of server controller 26 software regarding the presence of that packet.

Figure 12:
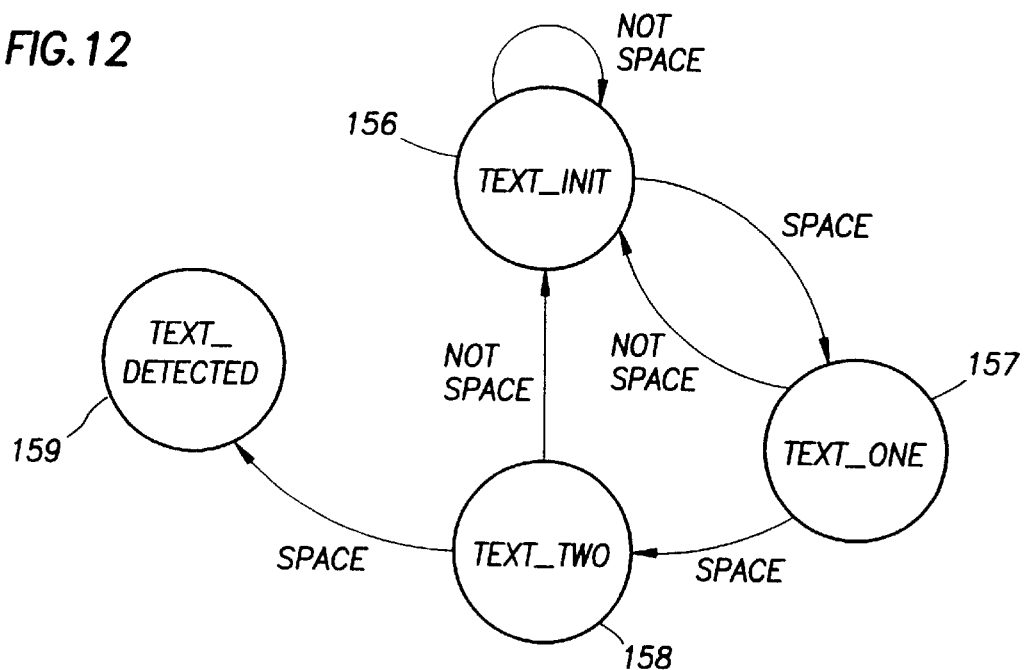
FIG. 12 is a state diagram illustrate a text protocol state machine used in detecting text communication protocol sent from the remote terminal.

Referring now to FIG. 12, a state diagram illustrating the text protocol state machine is shown. When the text protocol state machine detects three consecutive ASCII "return" characters (0x20), it indicates that a valid text protocol has been detected from the remote terminal 28. In the TEXT_INIT state 156, if the state machine receives a carriage return character, the state machine transitions to the TEXT_ONE state 157. Otherwise the state machine remains in the TEXT_INIT state 156. In the TEXT_ONE state 157, if the state machine receives a carriage return character, the state machine transitions to the TEXT_TWO state 158. Otherwise the state machine returns to the TEXT_INIT state 156. In the TEXT_TWO state 158, if the state machine receives a carriage return character, the state machine transitions to the TEXT_DETECTED state 159. Otherwise the state machine returns to the TEXT_INIT state 156. When the state machine reaches the TEXT_DETECTED state 159, it notifies an upper level task in the server controller 26 software that a valid text protocol has been detected.

Figure 13:
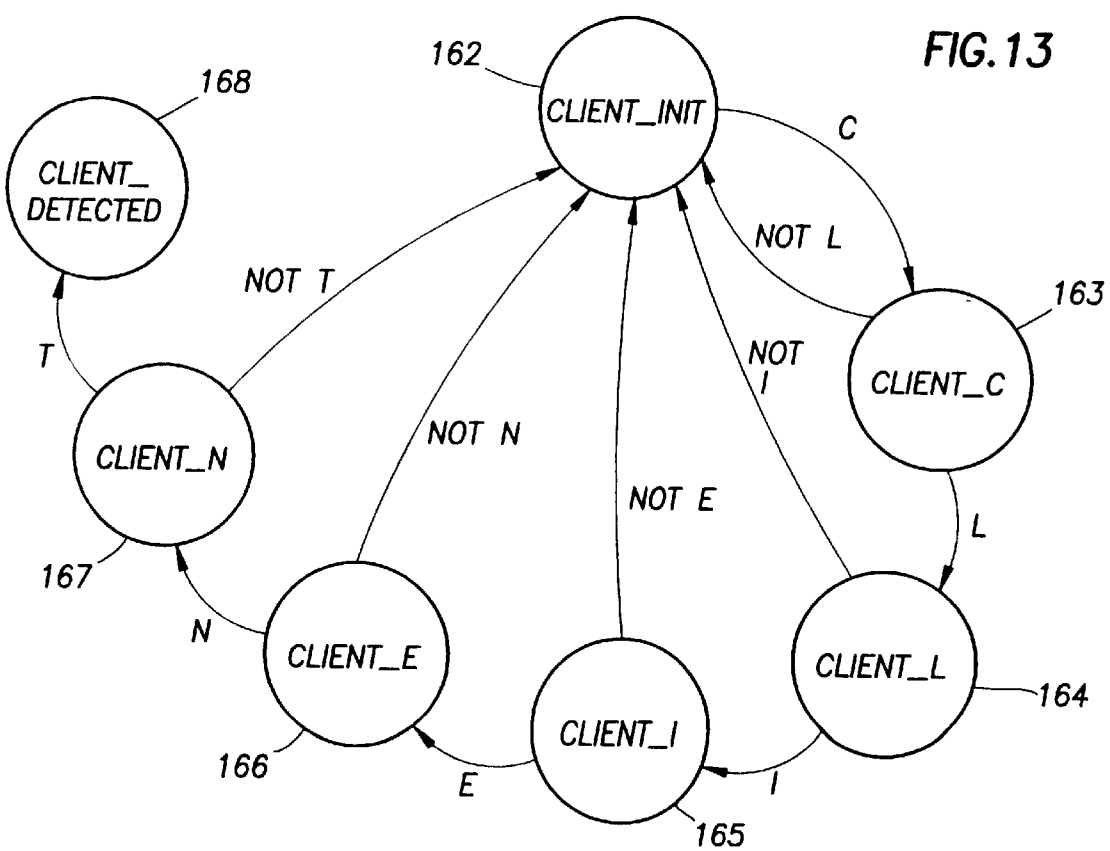
FIG. 13 is a state diagram illustrate a pre point-to-point (PPP) protocol state machine used in detecting pre-PPP communication protocol sent from the remote terminal.

Referring now to FIG. 13, a state diagram illustrating the pre-PPP state machine is shown. When the pre-PPP state machine detects the string "CLIENT", it indicates that a valid pre-PPP protocol has been detected from the remote terminal 28 and correspondingly transmits the string "CLIENTSERVER" to the remote terminal 28. In the CLIENT_INIT state 162, if the state machine receives a 'C', the state machine transitions to the CLIENT_C state 163. Otherwise the state machine remains in the CLIENT_INIT state 162. In the CLIENT_C state 163, if the state machine receives a 'L', the state machine transitions to the CLIENT_L state 164. This progression is maintained for each of the subsequent states 164, 165 and 166 to indicate possible receipt of CLIENT string. If the string is not fully received, then a transition occurs back to CLIENT_INIT state 162. Upon receiving the entire string, the state machine transitions to CLIENT_DETECTED state 168 and notifies an upper level task in the server controller 26 software that a valid pre-PPP protocol has been detected.

The following illustrates the format of the character sequence forming a valid PPP packet:

SYNCH ADDRESS CONTROL PROTOCOL . . . data . . . $CRC_{low}$ $CRC_{high}$ SYNCH

The SYNCH character is designated by a hexadecimal value 0×7E, the ADDRESS character is designated by a hexadecimal value 0×FF, and the CONTROL character is designated by a hexadecimal value 0×03. The ADDRESS and CONTROL character are optional, but if one is present both characters must be present. The PROTOCOL character(s) is one or two bytes depending upon the least significant bit (LSB) of the first byte. If the first byte has LSB set (i.e., 1), then the PROTOCOL character consists of only one compressed protocol byte. If the first byte has the LSB clear (i.e., 0), then the PROTOCOL characters consist of two uncompressed protocol bytes, the first byte being the low byte and the second byte being the high byte. The "data" bytes are the payload of the packet. The $CRC_{low}$ and $CRC_{high}$ characters comprise low and high bytes, respectively, of a cyclic redundancy check (CRC) on the data bytes.

Figure 14:
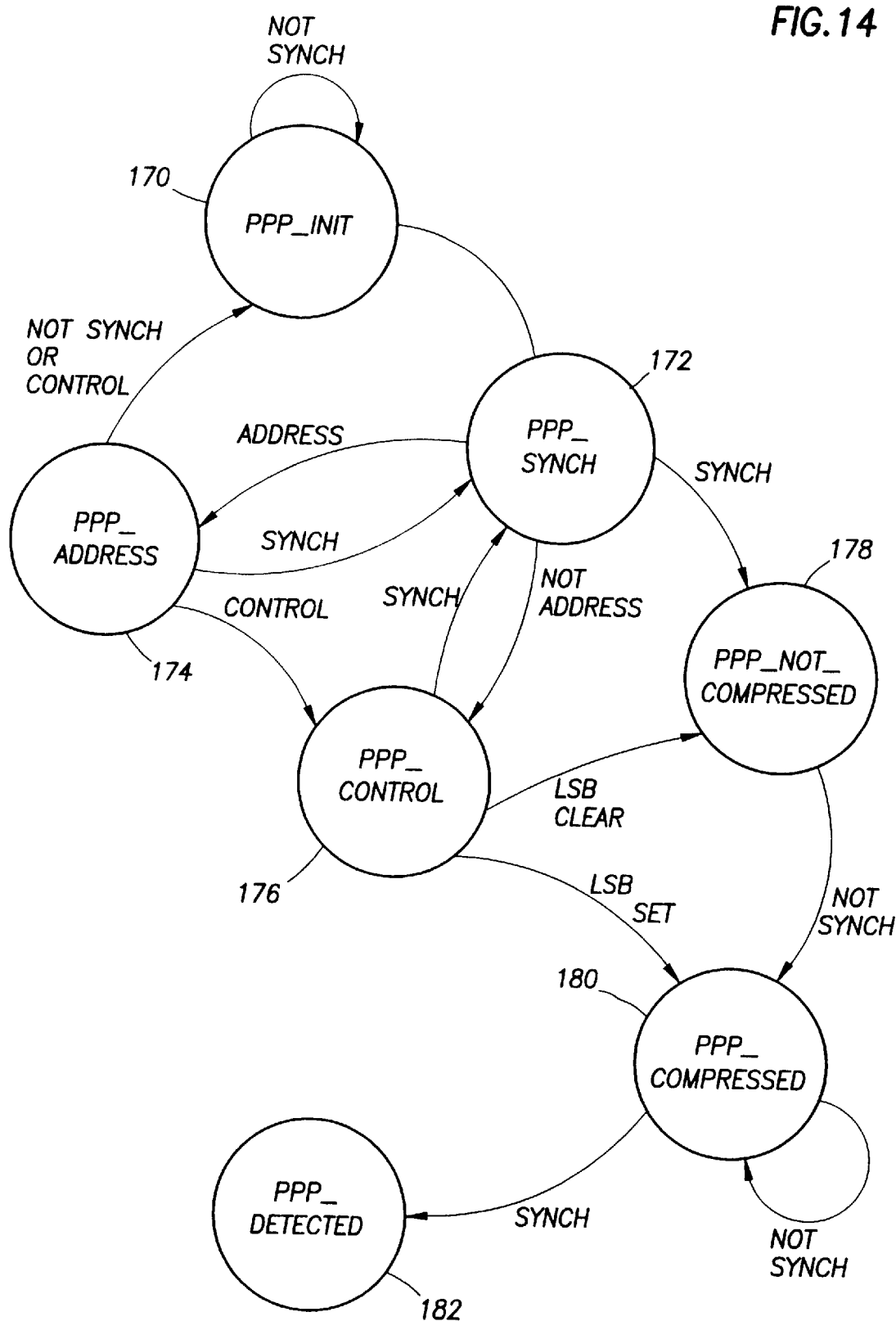
FIG. 14 is a state diagram illustrate a PPP protocol state machine used in detecting PPP communication protocol sent from the remote terminal.

Referring now to FIG. 14, a state diagram illustrating the PPP state machine is shown. When the PPP state machine detects a valid PPP packet, it indicates that a valid PPP protocol has been detected from the remote terminal 28. In the PPP_INIT state 170, if the state machine receives a SYNCH character, the state machine transitions to the PPP_SYNCH state 172. Otherwise the state machine remains in the PPP_INIT state 170. In the PPP_SYNCH state 172, if the state machine receives an ADDRESS character, the state machine transitions to the PPP_ADDRESS state 174. Otherwise the state machine transitions to the PPP_CONTROL state 176. In the PPP_ADDRESS state 174, if the state machine receives a CONTROL character, the state machine transitions to the PPP_CONTROL state 176. Or, if the state machine receives a SYNCH character, the state machine transitions to the PPP_SYNCH state 172. Otherwise the state machine transitions to the PPP_INIT state 170. In the PPP_CONTROL state 176, if the state machine receives a SYNCH character, the state machine transitions to the PPP_SYNCH state 172. Otherwise, if the LSB of the character is clear the state machine transitions to the PPP_NOT_COMPRESSED state 178 treating the character as the low byte of two non-compressed protocol bytes and if the LSB of the character is set the state machine transitions to the PPP_COMPRESSED state 180 treating the character as the single compressed protocol byte. In the PPP_NOT_COMPRESSED state 178, if the state machine receives a SYNC character, the state machine transitions to the PPP_SYNCH 172 state. Otherwise, the state machine transitions to the PPP_COMPRESSED state 180 treating the character as the high byte of two non-compressed protocol bytes. In the PPP_COMPRESSED state 180, if the state machine receives a SYNCH character, the state machine transitions to the PPP_DETECTED state 182. Otherwise, the state machine remains in the PPP_COMPRESSED state 180 and treats the character as a data or CRC byte. When the state machine reaches the PPP_DETECTED state 182, it notifies an upper level task in the server controller 26 software that a valid PPP protocol has been detected.

Server controller 26 provides an optional dial-back security feature to prevent unauthorized users from tampering with the server 10 via server controller 26. Using the server controller 26 console application software, the system administrator configures a list of user profiles each containing a username, password and phone number. When a user dials in, the server controller 26 receives a username and password from the user, verifies the username and password from the list of user profiles and then disconnects. If the username and password are verified in the list of user profiles, the server controller 26 then dials up the associated phone number in the list of user profiles. For an authorized user, the remote access proceeds as usual. If an intruder had obtained a valid username and password, the intruder will nevertheless lose the connection to the server 10 since the intruder will not be dialed back.

Server controller 26 advantageously dials back the authorized user with the same communications protocol used when the user dialed in. For example, if the user connected via a null-modem from a WINDOWS NT machine using the pre-PPP protocol, the server controller 26 will dial back the NT machine using the pre-PPP protocol. This is advantageous since it is likely that the remote terminal will expect to communicate with the server controller 26 using the same protocol with which it dialed in.

Figure 15:
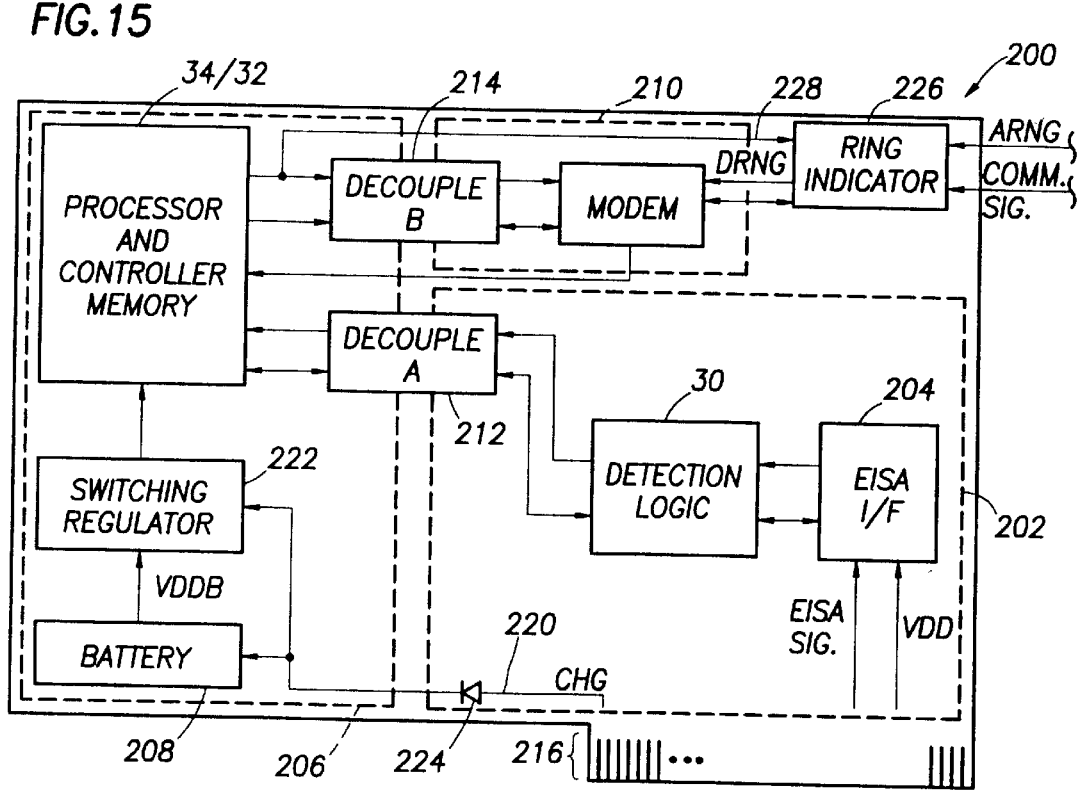
FIG. 15 is the server controller embodied upon a PCB adapted for coupling onto an expansion bus.

Referring now to FIG. 15, various components of server controller 26 are shown arranged upon a PCB 200. PCB 200 is segregated into a plurality of planes or portions. A first portion 202 accommodates an expansion bus interface unit 204 as well as detection logic 30. A second portion 206 accommodates processor 30 and controller memory 32, as well as a secondary power supply (i.e., battery) denoted as reference numeral 208. A third portion 210 accommodates communication unit (i.e., modem) 36. Portions 202, 206 and 210 are segregated from each other by a pair of decoupling units denoted as first decoupling unit 212 and second decoupling unit 214.

Power to PCB 200 is normally applied via edge connectors 216 from the expansion bus to which PCB 200 can be connected. One pin of edge connector 216 is reserved for primary power VDD routed to first, second and third portions 202, 206 and 210, respectively. Display data is snooped from the expansion bus and is forwarded over possibly several pins of edge connector 216 to detection logic 30 via interface unit 204. Upon losing VDD during, for example, server power down, decoupling unit 212 serves two functions. First, power conductors within first portion 202 are decoupled from power conductors within second portion 206. More specifically, the VDD conductor within first portion 202 is decoupled via decoupling unit 212 from the power conductor or conductors within second portions 206. Second, signal conductors within first portion 202 are decoupled from signal conductors within second portion 206. As the signal conductors are decoupled, the signal conductors are tri-stated.

Similar to the first decoupling unit 212, second decoupling unit 214 also decouples the power and signal conductors. If VDD ceases from the expansion bus and if communication unit 36 does not detect communication from remote terminal 28, then second decoupling unit 214 performs its decoupling operation. If, however, VDD is present or if remote terminal 28 is sending communication protocol, then second decoupling unit 214 effectuates coupling between second and third portions 208 and 210, respectively.

Decoupling units 212 and 214 preferably comprise quick switches upon the power conductors and bi-directional tranceivers with buffer/driver capability between signal conductors. The quick switches are obtainable from various vendors, such as National Semiconductor Corp. and Texas Instruments, Inc., and are formed as packaged arrays of JFETs with a common control input (i.e., output-enable OE input). The bi-directional tranceivers are well suited for driving high-capacitive loads and operate under high-speed conditions. A suitable bi-directional tranceiver can be obtained from Integrated Device Technology, Inc. or Texas Instruments, Inc. as fast CMOS tranceivers with tri-state output capability.

Coupled to one pin of edge connector 216 is a charge conductor 220. Charge conductor 220 is adapted to receive a voltage supplied by the expansion bus defined to exceed VDD. According to one embodiment, the desired voltage upon charge conductor 220 is 12 volts, wherein VDD equals 5 volts. Voltage supplied by charge conductor 220 serves not only to charge battery 208, but also to enable switching of switching regulator 222. If, for example, charge within charge conductor 220 goes below a threshold value, then switching regulator 222 activates coupling of battery 208 to second portion 206, and possibly third portion 210. Conversely, if charge on charge conductor 220 exceeds the threshold value, then output from battery 208 (i.e., VDDB) is not coupled to second portion 206 and third portion 210. Instead, in the latter instance, VDD is present thereto. A diode 224 is used to prevent discharge of battery 208 during times when charge upon conductor 220 is terminated.

A ring indicator 226 is coupled on the same power plane as second portion 206. Specifically, ring indicator receives VDDB upon conductor 228 during times when VDD is not present, or receives VDD if VDD is present. Accordingly, ring indicator 226 maintains power either from the primary or the secondary sources to detect an incoming analog ring ARNG signal. Upon receiving ARNG, ring indicator 226 forwards the ensuing communication protocol to communication unit 36 via the digital ring DRNG signal. By always maintaining power to ring indicator 226, detection of an incoming ring is always possible regardless of VDD status.

Figure 16:
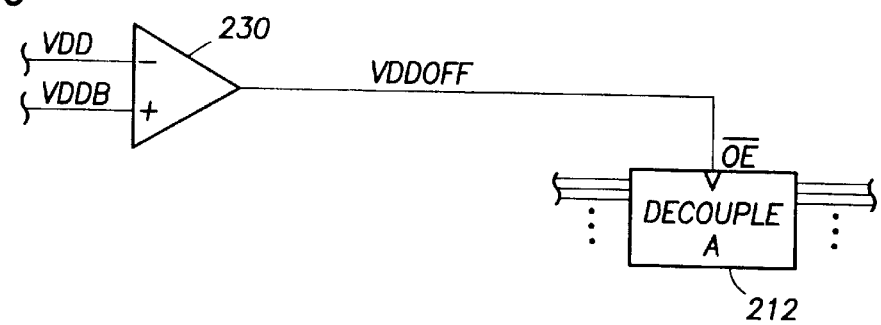
FIG. 16 is comparator logic used in decoupling signal conductors extending between power planes arranged within said PCB of FIG. 15.

FIG. 16 illustrates a comparator 230 used in determining if VDD becomes less than VDDB by a threshold amount. If VDD should happen to drop beyond the acceptable threshold, then comparator 230 produces a VDDOFF signal. The VDDOFF signal is presented on the output enable OE pin of decoupling of first decoupling unit 212. Comparator 230 thereby effectuates decoupling of signal conductors and power conductors between the first and second portions 202 and 206 if VDD supplied by the expansion bus becomes less than VDDB supplied by battery 208.

Figure 17:
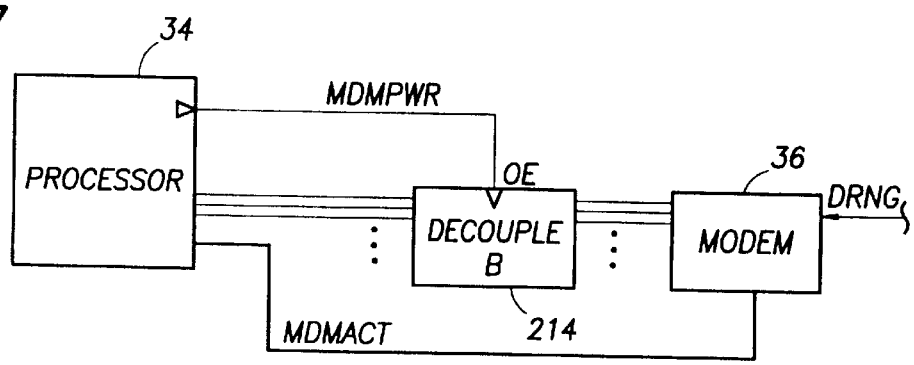
FIG. 17 illustrates signals used to couple signal conductors and power to a communication unit power plane during times when the communication unit is receiving a signal from a remote terminal.

FIG. 17 illustrates operation of digital ring DRNG, and its effect upon decoupling of power and signal conductors between second and third portions 206 and 210, respectively. If power to communication unit 36 is initially off, DRNG signal to communication unit 36 causes an interrupt to processor 34. As such, processor 34 is informed that a ring signal is present at communication unit 36, whereby processor 34 can then acknowledge its interrupt through MDMACT signal as well as presenting power to the modem via MDMPWR signal. More specifically, MDMPWR signal is fed to the output enable OE input of second decoupling unit 214. Upon receiving MDMPWR indicative of an incoming ring, second decoupling unit 214 couples the power and signal conductors extending between second portion 206 and third portion 210. Essentially, DRNG is gated with a signal indicative of whether communication unit 36 is on or off, the output of that gate being an interrupt to processor 34. Whenever processor 34 receives an interrupt, power from VDDB of processor 34 is supplied to communication unit 36. If power to communication unit 36 is on, then an interrupt is not asserted.

It will be appreciated to those skilled in the art having the benefit of this disclosure that this invention is capable of applications with numerous types of computer systems, with numerous types of electrical components, with numerous types of PCBs and with numerous types of communications protocols. Furthermore, it is to be understood that the form of the invention shown and described is to be taken as presently preferred embodiments. Various modifications and changes may be made without departing from the spirit and scope of the invention as set forth in the claims. It is intended that the following claims be interpreted to embrace all such modifications and changes and, accordingly, the specification and drawings are to be regarded in an illustrative rather than a restrictive sense.

What is claimed is:

1. A computer, comprising an expansion bus upon which a video controller and a server controller are locally connected, wherein said server controller monitors said expansion bus to detect write operations of display data destined solely for a volatile media of a display device associated with said video controller, and wherein said server controller comprises a controller memory for receiving said display data associated with a detected write operation simultaneously sent to said video controller.

2. The computer as recited in claim 1, wherein said server controller monitors said expansion bus without asserting mastership thereof.

3. The computer as recited in claim 1, wherein said server controller comprises detection logic for decoding said write operations within a video address range.

4. A computer comprising an expansion bus upon which a video controller and a server controller are locally connected and a server controller memory; wherein said server controller is configured to monitor said expansion bus to detect write operations of display data destined solely for a volatile media of a display device associated with said video controller; and wherein said server controller comprises detection logic configured to decode said write operations within a video address range and a data transceiver for communicating said display data associated with a detected write operation from the expansion bus to the controller memory simultaneously with transfer of said display data to said video controller.

5. The computer as recited in claim 1, wherein monitoring of said expansion bus comprises snooping.

6. The computer as recited in claim 1, wherein said server controller is a slave unit.

7. The computer as recited in claim 1, further comprising:

a bus bridge coupled between said expansion bus and a PCI bus; and a second video controller coupled to said PCI bus whereupon said second video controller is deactivated during times when said controller memory and said video controller are receiving said display data.

8. A server controller, comprising:

a controller bus interposed between a controller memory and a processor; and detection logic locally coupled between an expansion bus associated with a server and said controller bus said detection logic configured to detect a write cycle of display data on said expansion bus destined solely for volatile media of a display device, and for forwarding display data within said write cycle to said controller memory prior to completion of said write cycle.

9. The server controller as recited in claim 8, wherein said write cycle comprises an address cycle followed by a display data cycle.

10. The server controller as recited in claim 8, wherein said processor is coupled to grant mastership of said controller bus to said detection logic.

11. A server controller comprising:

a controller bus interposed between a controller memory and a processor; and detection logic locally coupled between an expansion bus associated with a server and said controller bus, said detection logic configured to detect a write cycle of display data on said expansion bus destined solely for volatile media of a display device and for forwarding display data within said write cycle to said controller memory prior to completion of said write cycle;

wherein said processor is coupled to grant mastership of said controller bus to said detection logic to cause said detection logic to assert a signal on said expansion bus to forestall termination of said data cycle until after mastership of the controller bus is granted to the detection logic.

12. The server controller as recited in claim 11, wherein said detection logic comprises a defeat timer for counting a predefined number of expansion bus clock cycles after termination of said data cycle and, at the termination of said predefined number of expansion bus cycles, said detection logic relinquishes mastership of said controller bus.

13. A method for snooping a write cycle of display data forwarded across an expansion bus from a server to a video controller, comprising:

detecting on said expansion bus said write cycle of display data occurring within a video address range using detection logic coupled to said expansion bus and by a controller bus to a controller memory;

obtaining mastership of said controller bus by said detection logic;

forwarding said display data occurring within said detected write cycle to said controller memory at substantially the same time in which said display data is also forwarded across said expansion bus to said video controller; and relinquishing mastership of said controller bus by said detection logic upon termination of said write cycle.

14. A method for snooping a write cycle of display data forwarded across an expansion bus from a server to a video controller said write cycle including an address-cycle followed by a data transfer cycle, said method comprising:

detecting on said expansion bus said write cycle of display data occurring within a video address range using detection logic;

obtaining mastership of a controller bus by detection logic operably coupled to a controller memory;

forwarding said display data occurring within said detected write cycle to said controller memory at substantially the same time in which said display data is also forwarded across said expansion bus to said video controller; and and wherein said detection logic relinquishes mastership of said controller bus prior to termination of said address cycle.

15. A method for snooping a write cycle of display data forwarded across an expansion bus from a server to a video controller, comprising:

detecting on said expansion bus said write cycle of display data occurring within a video address range using detection logic;

obtaining mastership of a controller bus by detection logic operably coupled to a controller memory;

forwarding said display data occurring within said detected write cycle to said controller memory at substantially the same time in which said display data is also forwarded across said expansion bus to said video controller; and obtaining mastership of said controller bus upon termination of said write cycle by a processor operably coupled to said controller memory thereby relinquishing mastership of said controller bus by said detection logic.

16. The method as recited in claim 15, wherein said processor is coupled to a communication unit in communication with a terminal located remote from said server, and wherein said processor retrieves and forwards input data from said communication unit to said controller memory during times when said mastership of said controller bus is relinquished by said detection logic.

17. The method as recited in claim 15, wherein said communication unit comprises a modem coupled in communication with a terminal located remote from said server, and wherein said communication unit forwards output data to said terminal during times when said mastership of the controller bus is relinquished by said detection logic.

18. A computer system comprising:

a processor coupled to a first bus;

a system memory coupled to the processor;

an expansion bus;

at least one bus bridge coupled between the first bus and the expansion bus;

a video controller coupled to the expansion bus;

a video memory coupled to receive video data from the expansion bus;

a server controller coupled to the expansion bus, the server controller configured to monitor the expansion bus to detect write operations of video data to the video memory and to receive a copy of the video data associated with a detected write cycle substantially simultaneously with the receipt by the video controller of said video data over said expansion bus.

19. The system of claim 18 and further comprising a display device coupled to the video controller.

* * * * *